INVENTORS
PAUL E. GOLDSBERRY
WILSON I. LOCKETT
BY D. Kendall Cooper
ATTORNEY

Dec. 26, 1967  P. E. GOLDSBERRY ET AL  3,360,783
ACCOUNTING APPARATUS
Filed June 30, 1965  19 Sheets-Sheet 3

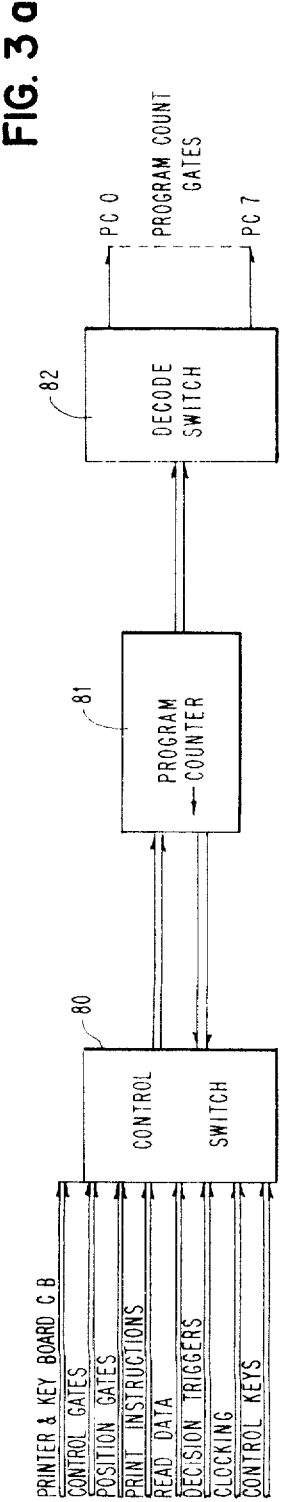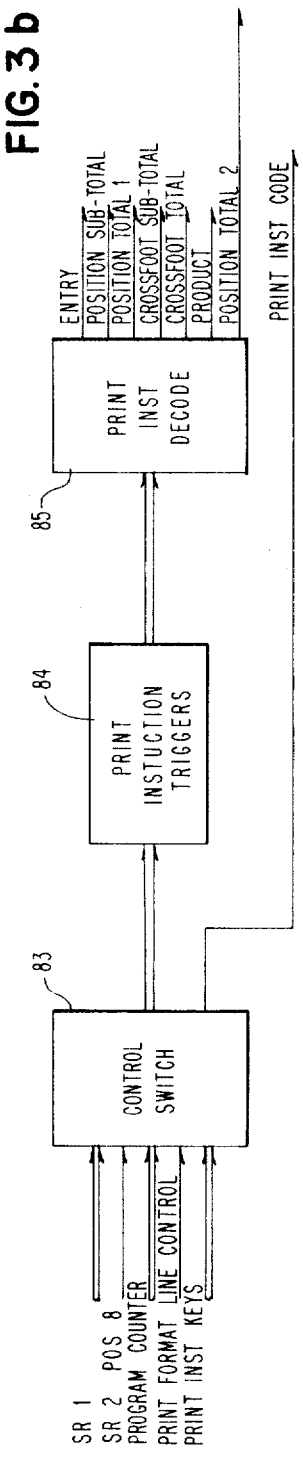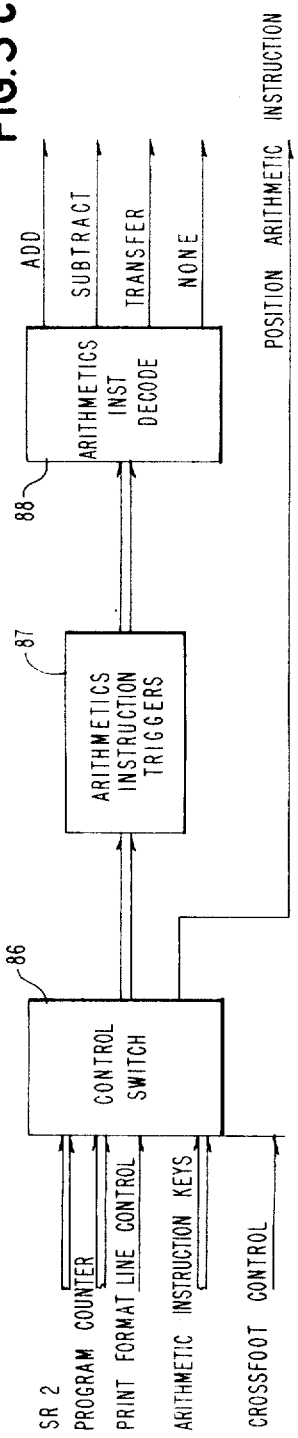

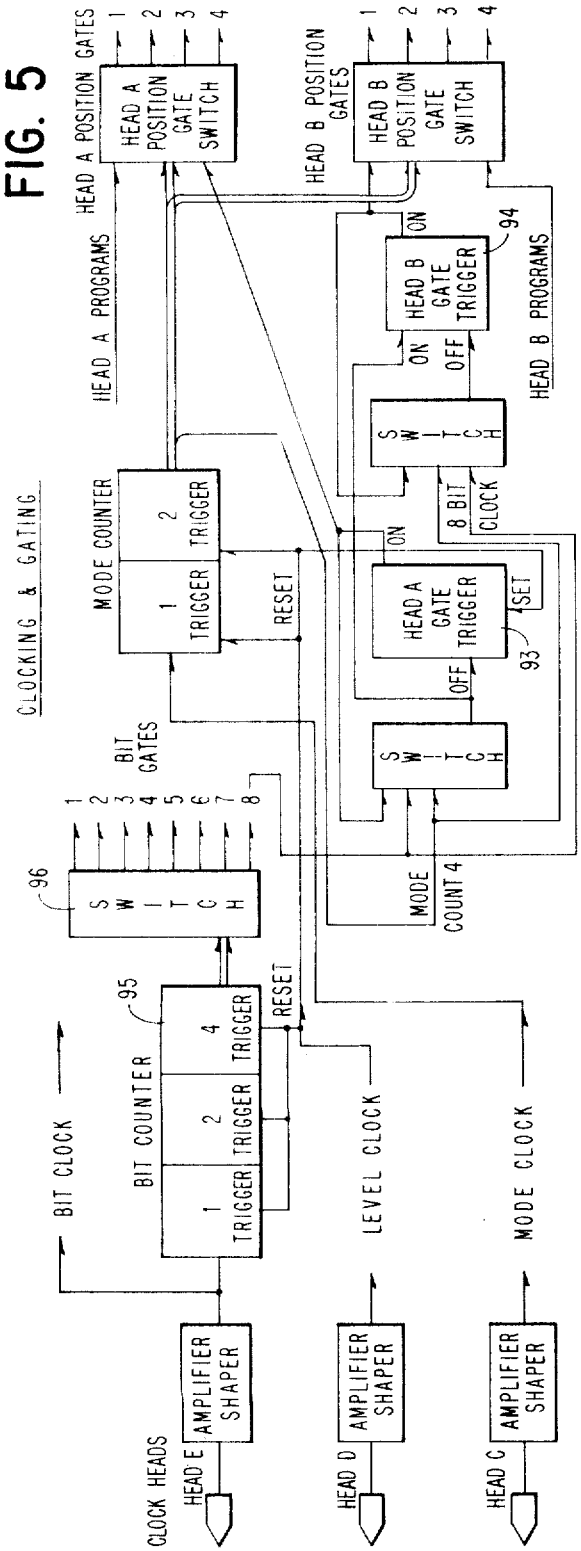
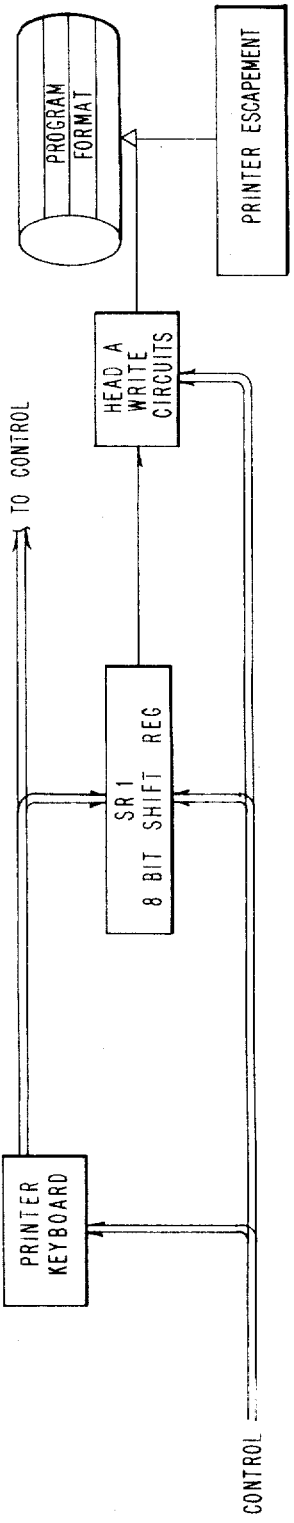
FIG. 5
FIG. 6

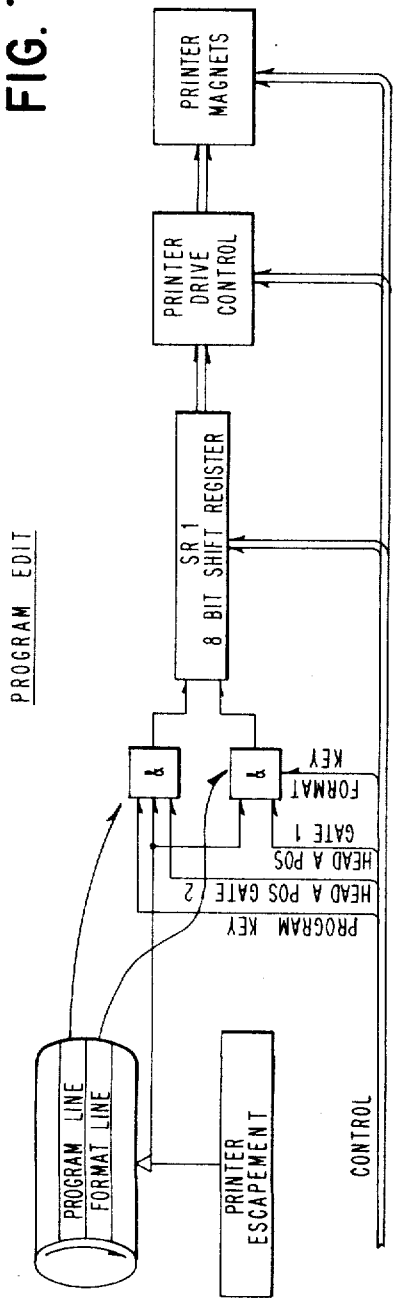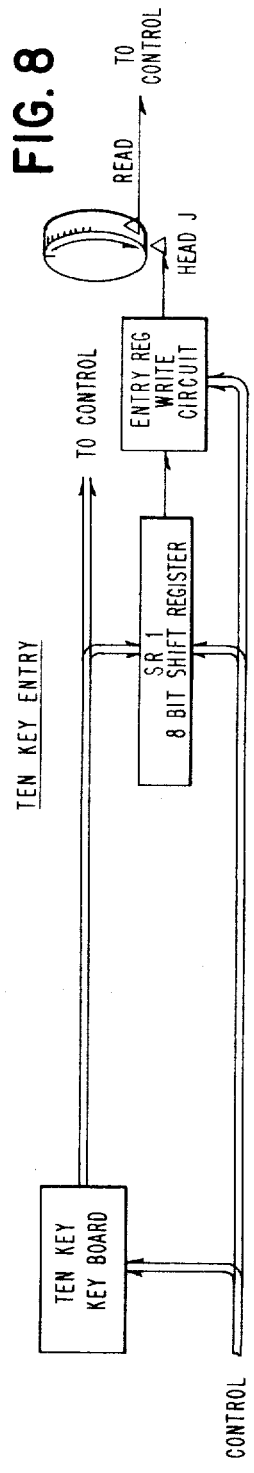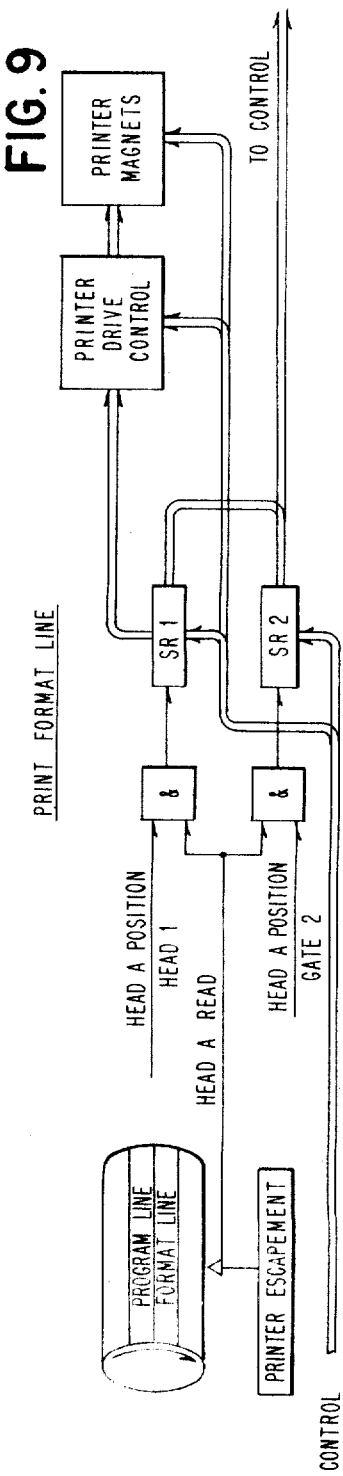

Dec. 26, 1967  P. E. GOLDSBERRY ET AL  3,360,783
ACCOUNTING APPARATUS
Filed June 30, 1965  19 Sheets-Sheet 11

FIG. 26

ARITHMETIC REGISTERS TO POSITION STORAGE-PRINT ARITHMETIC REGISTERS

Inputs to gate 150:
- PRINT FROM ARITHMETIC REGISTER
- SUM REGISTER READ
- PC 1
→ SR 1 DATA INPUT Inputs:
- INHIBIT S R GATE
→ SR 1 & 2 CONTROL GATE Inputs:
- ENTRY REGISTER READ
- PC 1
- CROSSFOOT TOTAL (through I inverter)
→ SR 2 DATA INPUT Inputs:
- CROSSFOOT REGISTER READ
→ SR 2 DATA INPUT Inputs to gate 160:
- PC 3
- HEAD A POSITION GATE 1
- POSITION TOTAL 1 INSTRUCTION ┐ OR (161)
- POSITION SUB TOTAL INSTRUCTION ┘
→ GATE SR 1 TO PRINTER Gate 163 (through inverter 162):
→ GATE SR 2 TO PRINTER

FIG. 27

Inputs to gate 165:
- PRINT FROM ARITHMETIC REGISTER (150)
- PC 3
- HEAD A POSITION GATE 3
→ HEAD A WRITE GATE SR 1 CONTROL Inputs to gate 166:
- POSITION TOTAL 1
- HEAD A POSITION GATE 4
→ HEAD A WRITE GATE SR 2 CONTROL Inputs to gate 164:
- SR 1
- POSITION TOTAL 1
- POSITION TOTAL 2
→ HEAD A WRITE DATA Inputs to gate 167:
- SR 2
- POSITION TOTAL 1
→ HEAD A WRITE DATA Inputs to gate 168:
- PC 3
- HEAD A POSITION GATE 4
- POSITION TOTAL 2
→ HEAD A WRITE GATE

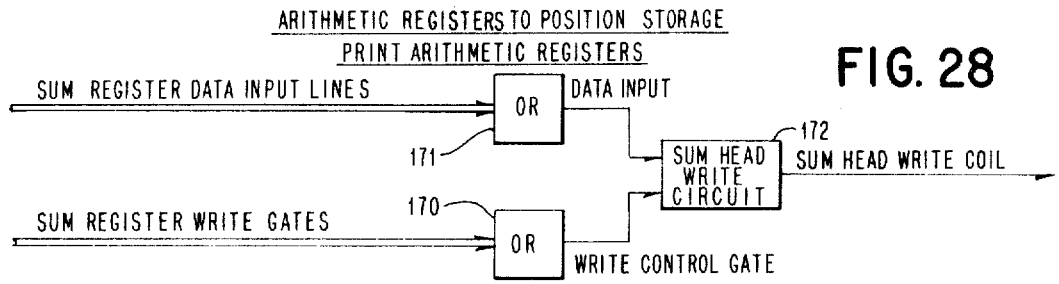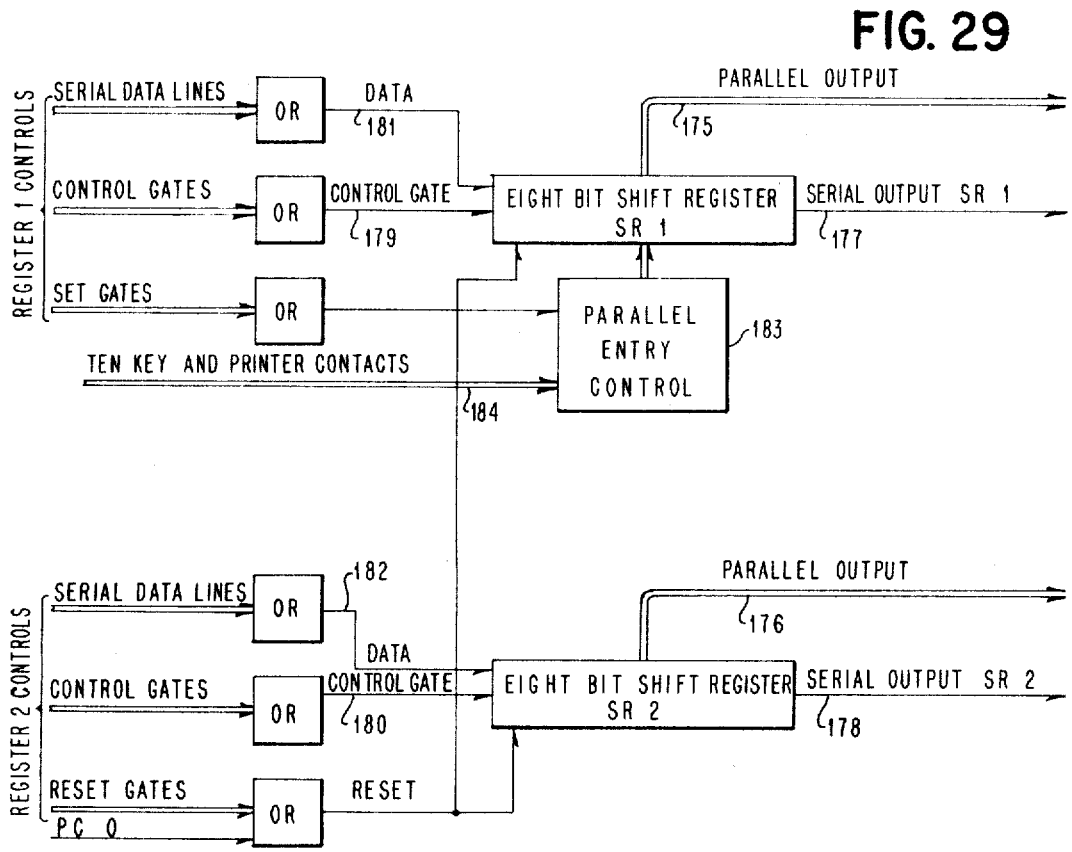

United States Patent Office 3,360,783
Patented Dec. 26, 1967

3,360,783
ACCOUNTING APPARATUS
Paul E. Goldsberry and Wilson I. Lockett, Lexington, Ky., assignors to International Business Machines Corporation, Armonk, N.Y., a corporation of New York
Filed June 30, 1965, Ser. No. 468,310
14 Claims. (Cl. 340—172.5)

ABSTRACT OF THE DISCLOSURE

The apparatus comprises a printer and keyboard, a numeric keyboard, and a number of control key areas. The printer mechanism includes a platen and a single element print head for printing a document. Associated with the printer is a magnetic drum having a group of clocking and arithmetic transducer heads. Head A is incremented along the drum, with the spacing corresponding to the escapement intervals applicable to the print head. Therefore, the tracks are correlated with horizontal document locations. An auxiliary Head B is mounted for longitudinal movement by accessing format and program information. The control key area includes two buttons designated Level and Mode for positioning timing heads C and D.

The primary procedures of interest in the equipment are as follows:
(1) Format or Program Entry.
(2) Edit Control.
(3) Ten Key (Numeric) Entry.
(4) Print Format Line.
(5) Position Storage or Numeric to Arithmetic Registers.
(6) Arithmetic Registers to Position Storage With Printing.

BACKGROUND OF INVENTION—FIELD AND PRIOR ART

With the advent of automatic data processing, many types of operator-oriented accounting and bookkeeping equipment have been developed for the market place. Such equipment has generally included data and control keys, document printing facilities, and some form of storage for both data and program information. Due to its relatively low cost and consequent hardware limitations, such equipment has invariably been characterized by inflexible and cumbersome data processing and programming techniques including relatively fixed pinboards or control panels, prepunched tape elements that require changing, or similar control members.

OBJECTS

Therefore, an object of the present invention is to provide a bookkeeping accounting machine with considerable programming ability.

Another object of the invention is to provide accounting apparatus that features manually controlled automatic entry of stored program information.

Another object of the invention is to provide accounting apparatus with flexible punctuation control and with facilities for handling repetitive data.

Also, an object of the invention is to provide apparatus of this nature with control of program, printing format, and other machine operations, including arithmetic operations, in an automatic fashion.

Still another object of the invention is to provide apparatus of this nature with procedures for editing format and program information in associated storage.

Another object of the invention is to provide automatic accounting apparatus with provision for manual entry and control procedures on the part of the operator.

Still another object of the invention is to minimize the attention required in allocation of memory locations for storage of format and program information.

Still another object of the invention is to provide accounting apparatus with simplified arrangements for the entry of repetitive data, format information, and program information into associated storage.

An additional object of the invention is to provide bookkeeping apparatus having associated storage means wherein a portion of the storage addressing procedure is inherently provided by the configuration of the apparatus.

Still another object of the invention is to provide accounting apparatus with unique arrangements for accessing format and program information.

A still further object of the invention is to provide bookkeeping apparatus with considerable flexibility and with provision for handling all procedures normally required in a bookkeeping application with balanced automatic and operator controlled functions.

An additional object of the invention is to provide an apparatus with both manual and automatic accessing of stored information.

SUMMARY

In order to accomplish these and other objects of the invention, an accounting-bookkeeping machine has provision for printing lines of information on an accounting document and an associated storage means with accessing facilities that are inherently operative to access storage locations that are correlated with printing positions on the document. In further accomplishment of the objects of the invention, the machine features facilities for entering program and format information and for editing the same, as desired. In addition, the equipment has auxiliary accessing means associated with storage for detecting program and format information on a field basis with respect to a document. Also, the apparatus has provision for accessing portions of storage selectively under manual operator control during bookkeeping procedures. With the arrangements disclosed, the format and program information stored in the equipment is effective to control operation of the apparatus automatically and inherently under control of the relative location of the printing means and the accounting document.

The foregoing and other objects, features, and advantages of the invention will be apparent from the following more particular description of the preferred embodiment of the invention as illustrated in the accompanying drawings.

DESCRIPTION OF THE DRAWINGS

In the drawings.

FIGS. 3a, 3b, 3c and 3d represent intermediate level diagrams of certain control areas in the circuits of FIGS. 2a and 2b.

FIG. 5 illustrates circuits for developing the pulses in FIG. 4.

FIG. 6 is a flow diagram for format or program entry.

FIG. 7 is a flow diagram for program editing control.

FIG. 8 represents data flow during a ten key entry operation.

FIG. 9 illustrates data flow for printing of format information.

FIGS. 25, 26, and 27 represent detailed circuits for printing from arithmetic register and transferring to position storage.

FIGS. 28 and 29 represent intermediate level logic diagrams that are useful in connection with the other figures.

DETAILED DESCRIPTION—ABBREVIATIONS AND TERMS

For convenience, the following abbreviations and terms are used in the present application:

| Abbreviation: | Definition |
|---|---|
| Arith | Arithmetic |
| Auto | Automatic Operation |
| CB | Circuit Breaker |
| Char | Character |
| CF Tot | Crossfoot Total |
| CK | Control Key |
| CLR | Clear Tab Stop (Printer) |
| Edit | Edit Format or Program |
| Ent Dec | Enter Decimal |
| FMT Reg. | Format Register |
| Index | Line Space or Index (Printer) |
| Instr | Instruction |
| Lock | Shift Lock (Printer) |
| Mar Rel | Margin Release (Printer) |
| Non Add | Not Addition |
| PC | Program Count |
| POS | Position |
| PR | Position Register |
| PR Subt | Position Register Substract |
| PRG REG | Program Register |
| PT or Pos Tot | Position Register Total |
| R | Read |
| Reg. | Register |
| Res | Restore |
| Set | Set Tab Stop (Printer) |
| Shift | Printer Shift |
| Sub Tot | Sub-Total |
| Subt | Subtract |
| SR | Shift Register |
| Tab | Tabulate |
| TRF | Transfer |
| TW | Typewriter (Printer) |
| W | Write |
| X1 | Trigger X1 Output |
| $\overline{X1}$ | Logical Not X1 Output |
| & | Logical And |
| — | Minus Sign |

GENERAL ORGANIZATION

Figure 1:
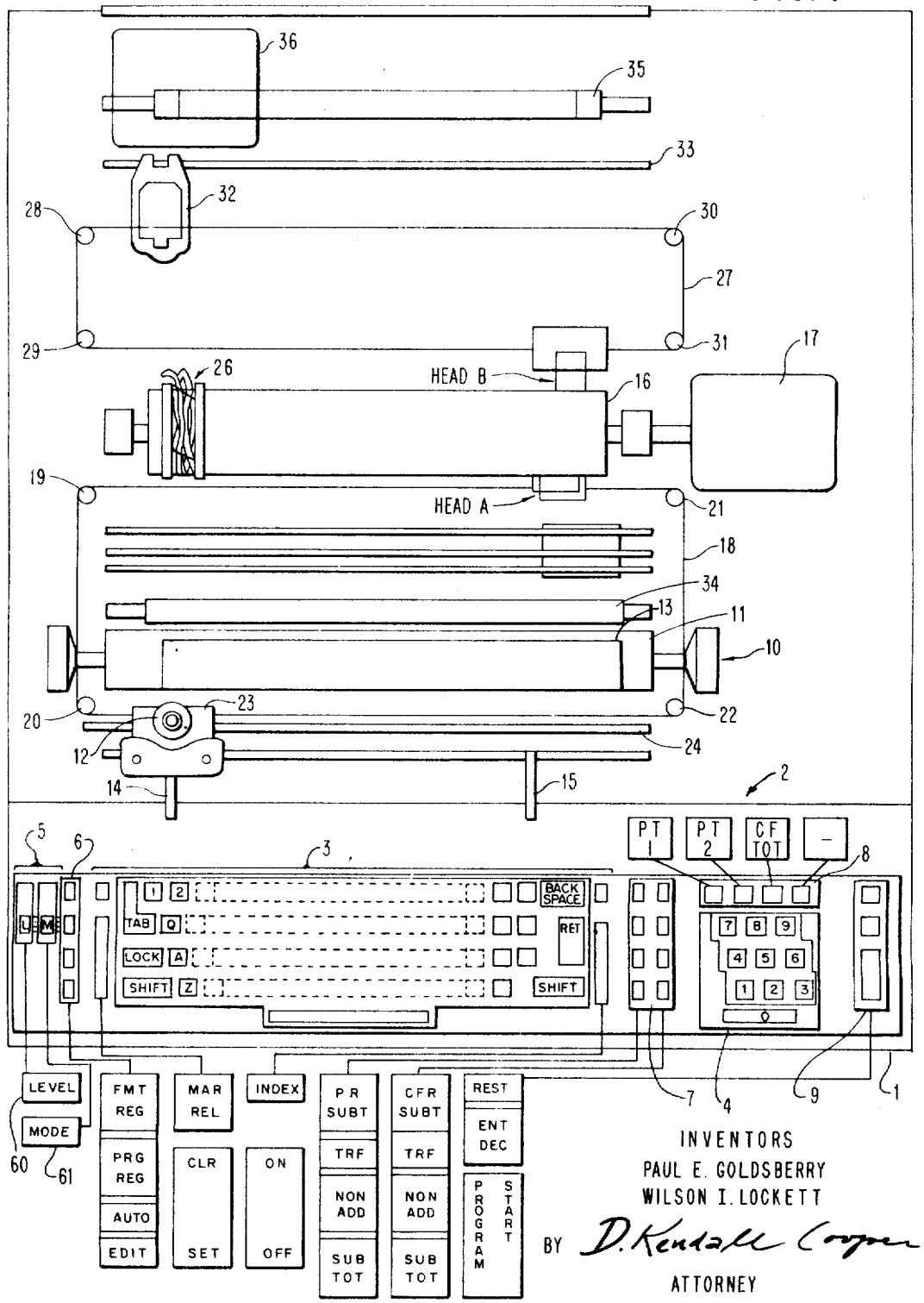
FIG. 1 is a top elevation of accounting-bookkeeping apparatus incorporating the principles of the present invention.
Figure 2A:
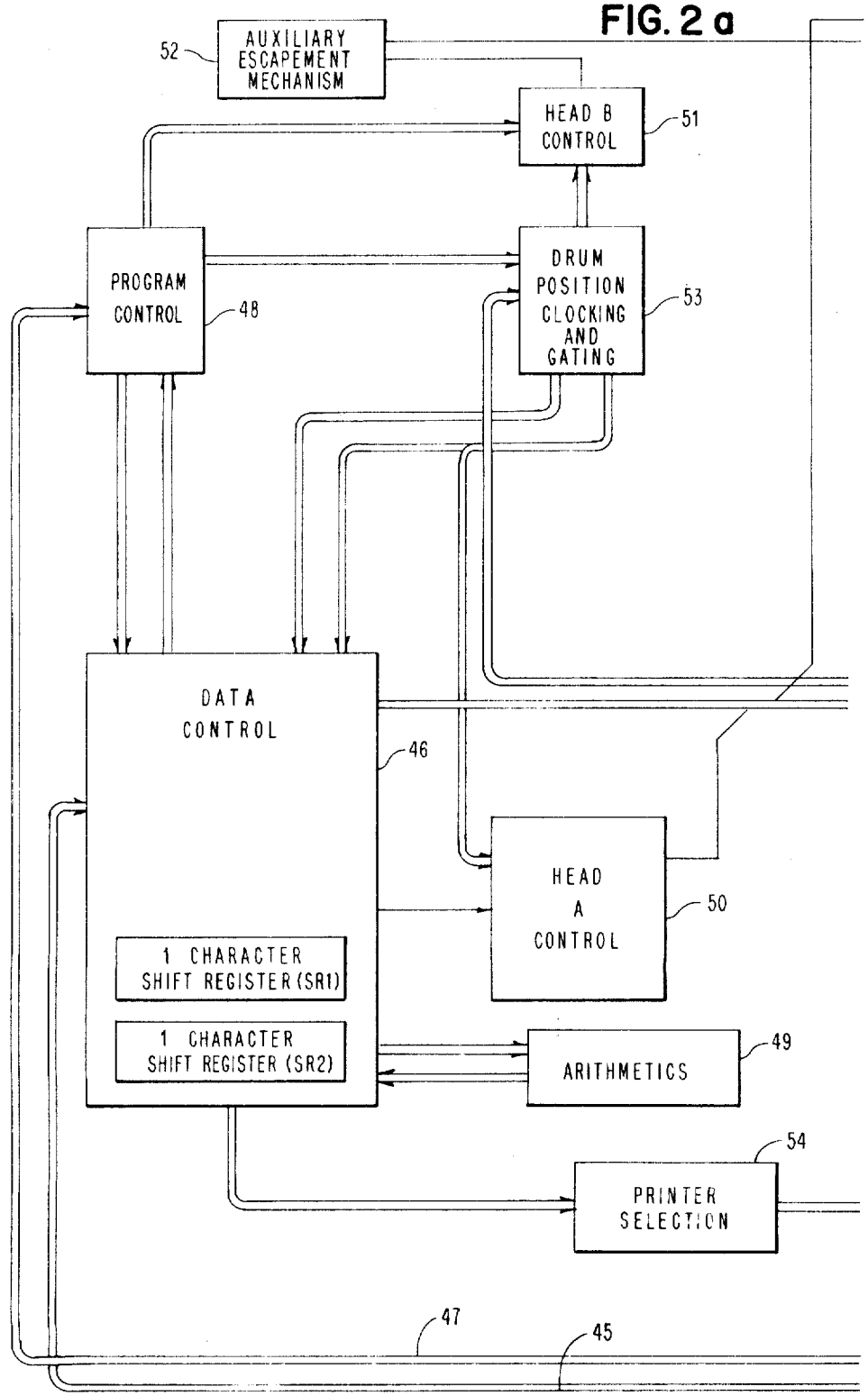
FIGS. 2a and 2b, arranged with FIG. 2a to the left of FIG. 2b, represent a block diagram of the apparatus of FIG. 1 and a typical accounting application for the equipment.
Figure 2B:

FIGS. 1, 2a, and 2b illustrate the general organization of the equipment. Referring to FIG. 1, the various elements comprising the apparatus are mounted on a frame 1. The elements comprise a keyboard area 2 that includes a printer keyboard 3, a numeric keyboard 4 and a number of control key areas indicated at 5, 6, 7, 8, and 9. Under control of printer keyboard 3 is a printer mechanism indicated at 10 that includes a platen 11 and a single element print head 12 for printing a document 13. Printer 10 has left and right margin stops 14 and 15.

Positioned to the rear of printer 10 is a magnetic drum 16 that is driven at high speeds by motor 17. Drum 16 has an associated group of clocking and arithmetic transducer heads at 26. Associated with magnetic drum 16 is a magnetic storage transducer designated Head A that is movable from the home position shown in FIG. 1 longitudinally of drum 16 from right to left in FIG. 1. Head A is connected to a cable 18 mounted on pulleys 19, 20, 21, and 22. Cable 18 is connected with a carrier 23 that supports print head 12. Carrier 23, shown in the home position at the left margin in FIG. 1, is movable to the right along a rod 24, until it encounters the right margin stop 15. Due to the interconnection of cable 18, as head 12 escapes to the right during printing, head A associated with drum 16 moves from right to left along the surface of drum 16.

Head A is incremented along drum 16, with the spacing corresponding to the escapement intervals applicable to print head 12. Therefore, any track on drum 16 adjacent to which head A is positioned, is directly and synchronously correlated with a horizontal position of print head 12 with respect to document 13.

Also associated with drum 16 is a magnetic auxiliary transducer designated Head B, that is interconnected by a cable 27 mounted on pulleys 28, 29, 30, and 31 to a carrier assembly 32. Carrier assembly 32 is mounted for longitudinal movement on rod 33 under control of escapement mechanism that is comparable to the escapement mechanism in printer 10.

Printer 10 has an associated tab stop assembly 34 and carrier 32 has an associated tab stop assembly 35. Mechanical linkage is preferably provided to enable setting and clearing of the tab stops in both assemblies 34 and 35 under control of the SET and CLEAR (CLR) button on keyboard 3. A motor 36 supplies driving power for the elements required to drive carrier 32. Carrier 32 is driven independently of the escapement for carrier 23 and printer 10 and as carrier 32 moves from its home position in FIG. 1 from left to right, head B moves to the left along drum 16 from the home position shown.

Head A is always at a horizontal location on drum 16 that directly represents the horizontal location on document 13, while head B, since it is possible to escape head B independently, may be in the same horizontal position as head A, or may be stepped along drum 16 for advance reading purposes.

Referring to FIGS. 2a and 2b, drum 16 and document 13 are shown in more detail. Print head 12 is indicated as being positioned adjacent platen 11 and controlled by the typewriter printer escapement by way of line 38. Escapement 37 also controls head A by line 39. Keyboard 2 is indicated with portions that correspond to those previously given in connection with FIG. 1. These include primary keyboard 3, numeric keyboard 4, and control key areas 5, 6, 7, 8 and 9. The various keys in these areas are indicated in greater detail at the bottom of FIG. 1.

In FIGS. 2a and 2b, data entries from printer keyboard 3 and numeric keyboard 4 flow by cable 45 to Data Control 46. Data Control 46 has two shift register designated SR1 and SR2. Control information entered from keyboard 2 is directed by cable 47 to Program Control 48. The equipment includes an Arithmetic section 49 for arithmetic functions in connection with data supplied by Data Control 46. The positioning of head A and recording and reproducing of signals is generally under control of the block 50, designated Head A Control. Head B is controlled by Head B Control 51.

Head A is directly correlated with print head 12 by being directly under control of typewriter escapement 37. The position of head B is controlled by auxiliary escapement mechanism 52. A Drum Position Clocking and Gating block 53 provides clocking and gating pulses to the various portions of the system.

Data, format and program signals are applied to printer selection block 54 for printing by print head 12.

PRINTING (TYPEWRITING) APPARATUS

The principles of correlation of printer and storage transducer disclosed herein may be applied to a movable carriage-typebar printer with the horizontal carriage position bearing a synchronized relation to the transducer, but printer 10 is preferably of the type disclosed in U.S. Patent 2,919,002 to L. E. Palmer—Selection Mechanism for A Single Printing Element Typewriter and as fully described in the IBM Instruction Manual, Form No. 241–5032, dated April 1964. The printer is further modified for input/output operation as taught in U.S. Patent 3,082,854, F. E. Becker—Typewriter Input Checking Mechanism, and as further described in the IBM Manual of Instruction, Form No. 241–5159, dated 1965, and the IBM Reference Manual, Form No. 225–1726, dated 1962.

The Palmer patent describes a typewriting printer having a single element print head with all characters of a type font located on the surface of the head. As noted, head 12, FIGS. 1 and 2b, is mounted on carrier 23 for movement in a path adjacent to and in parallel relation with respect to platen 11 which remains stationary, except for line spacing operations.

A character in such a printer is selected by tilting and rotating the single element print head in response to depression of one of a plurality of keylevers, each keylever being assigned to a character on the head. The keylevers selectively actuate a displacement mechanism having two principle portions, one for tilting and another for rotating the printing head. More specifically, selecting links are operated which determine the pivot points of connecting members to produce an output of predetermined displacement and direction. In each portion of the displacement mechanism, the value of the output is determined by the links selected, either singly or in combination. Following selection, print head 12 is actuated against the document, such as document 13, FIGS. 1 and 2b, to effect printing of the selected character. Keyboard 3 of printer 1 has keybuttons for selecting individual characters for printing, as well as effecting various functions in the printer. The functions provided for include Shifting from upper case to lower case and vice versa, depending upon the character selected. Spacing, Backspacing, Carrier Return (RET), Tabulate and Indexing. During a Carrier Return operation, the platen and document are spaced one line space in order to place the print head in position for printing on a new line. An Indexing operation normally effects a line space without a Carrier Return operation.

Depression of a character key on keyboard 3, FIG. 1, causes movement of an associated interposer to the rear of printer 10. The details of hardware and operation of the printer are covered in the aforementioned Palmer and Becker patents and the IBM Manuals. Movement of an interposer to the rear effects movement of selector bails in various combinations depending upon the interposer that has been moved. Movement of any interposer also effects movement of a cycle bail which through various linkages, effects release of a cycle clutch in printer 10, and subsequent rotation of a filter shaft.

Depending on the interposer that is moved to the rear of the printer, various combinations of the selector bails are moved toward the front of the printer. There are five selector bails that operate associated latch interposers which are utilized for rotating and tilting print head 12, FIG. 1, in order to effect selection of the particular character corresponding to the key depressed.

Movement of the latch interposers in printer 1 also results in closure of various transmitting contacts designated R–1, R–2, R–2a, R–5, T1, T2, Check, and No. 8, not shown. The transmitting contacts serve to supply signals to Data Control 46.

During output operations seven magnets designated R1, R2, R2a, R5, T1, T2, and Check, not shown, are energized in a selective manner to control rotating and tilting of print head 12 for printing purposes. The R1, R2, R2a, and R5 designations relate to four rotate situations for positioning print head 12, and the T1 and T2 designations relate to the two tilt selection situations for positioning print head 12.

As described in the aforementioned patents and manuals, both printer 10 and the mechanism associated with head B include an operational selection unit having a number of magnets, each concerned with a particular functional operation. Associated contacts are selectively closed and opened to indicate the performance of the function required. Printer 10 and the head B mechanism each includes a number of circuit breaker contacts as follows:

C1—Print transmitting contact
C2—Print feedback contact
C3—Upper case contact
C4—Lower case contact
C5—Tab, space and backspace
C6—Carrier return Also provided are Carrier Return interlock contacts and Tabulate interlock contacts.

NUMERIC KEYBOARD AND CONTROL KEYS

Associated with printer keyboard 3 is an additional numeric keyboard 4 for entering numeric information encountered during document preparation. Numeric keyboard 4 has 10 keys designated 0, 1, etc., through 9. Depression of one of the keys on keyboard 4 closes contacts that selectively represent in combination the character selected. The signals developed by contact closures are supplied to Data Control 46 by cable 45.

Also included as a part of the larger keyboard 2 are the control key areas 5, 6, 7, 8, and 9. The control key designations are given in FIG. 1 and have the following functions.

Control key area 5 includes two buttons 60 and 61 designated Level and Mode respectively. Level button 60 is movable to one of four positions and through mechanical linkage 62, FIG. 2b, positions head C adjacent to one of four timing tracks to select one of four sectors on drum 16 designated Level 1–Level 4, respectively. Mode button 61 is movable to one of four positions and by mechanical linkage 63 positions head D adjacent to one of four clocking tracks to select one of four segments within a sector or Level selected by Level button 60.

Control key area 6 includes four buttons as follows:

FMT REG-Fomat Register. Depression of this button selects a format register on drum 16.
PRG REG-Program Register. Depression of this button selects a program register on drum 16.
Auto-Automatic. Depression of this button places the equipment in automatic operation.
EDIT. Depression of this button conditions machine circuits for editing and printing out the contents of a selected format register or program register.

Control key area 7 includes the following buttons:

PR SUBT and CFR SUBT-Program Register Subtract or Crossfooting Register Subtract. Depression of either of these buttons effects a subtraction operation with respect to a selected program register or crossfooting register.

TRF-Transfer. Depression of the Transfer button causes a transfer operation to take place from one register to another.

NON ADD-Depression of the Non Add button initiates an operation without addition.

SUB TOT-Sub Total. Depression of a sub total button indicates that the amount involved is a sub total.

*Control key area 8* includes the following control keys:

PT1-Position Total 1. Depression of this button initiates print out of Position register 1 total.

PT2-Position Total 2. Depression of this button results in the printing of a total amount from Position register 2.

CF TOT-Crossfooting Total. Depression of the Crossfooting Total button initiates print out of the total amount stored in the Crossfooting register.

Sign (—) Depression of this button results in the entry of a sign (—) to indicate a negative entry.

*Control key area 9* includes the following control keys:

REST-Restore. Depression of this button clears the Entry register and establishes a Ten Key Entry mode.

ENT DEC-Enter Decimal. Depression of this button enables the entry of decimal factors from numeric keyboard 4.

PROGRAM START. Depression of this button initiates cycling of the equipment through a program.

DRUM ORGANIZATION

The periphery of drum 16 is divided into four equal sectors designated Level 1, Level 2, Level 3, and Level 4. As indicated in connection with the control keys, heads C and D respond to clocking track pulses on drum 16 to select one of the levels and in addition, a particular segment of mode within a selected level.

In order to illustrate to best advantage the principles of the invention, it assumed that a document 13, which is an accounting invoice, is under preparation in the apparatus. Each sector or level on drum 16 has four format and program areas designated Format 1-Program 1 through Format 4-Program 4 and a fifth area that accommodates accumulated totals in two position registers designated Position Register 1 and Position Register 2. Therefore, each level includes five segments. It is assumed that the format and program requirements for preparing document 13 is contained within Level 2. Level 2 is selected by positioning head C to recognize level 2 pulse 70 under control of level button 60. During the preparation of document 13, one of the modes or segments of Level 2 is selected by operator manipulation of button 61 that positions head D for recognizing one of the mode timing pulses 71–74. The fifth segment of Level 2 is selected automatically by the equipment, under certain circumstances.

As discussed in connection with FIG. 1, as print head 12 escapes from left to right during the course of printing document 13, head A escapes in synchronism so that the position of head A with respect to drum 16 is directly correlated and each track on drum 16 represents a particular horizontal position on document 13.

In FIG. 1, head A is shown moving from right to left along drum 16 as print head 12 moves from left to right with respect to document 13. For convenience however, in FIG. 2b, head A is shown as having a home position that corresponds directly to the home position of print head 12 with respect to document 13. Accordingly, in FIG. 2b, head A is assumed to move from left to right along drum 16 in synchronism with the movement of print head 12 from left to right during the printing of document 13.

In addition to heads A, B, C, and D, drum 16 has magnetic heads E, F, G, H, I, and J that are respectively associated with particular tracks on drum 16 at 26, FIG. 1. Head E recognizes bit timing pulses in the bit clock track on drum 16. If each sector on drum 16 has ten characters of 8 bits each or 80 bits, the total number of bit locations around the circumference of drum 16 will be 320. If desired, a one character and two character register may also be provided with writing and reading performed by heads F and G. Heads H, I, and J are associated with a Sum register, a Crossfoot register, and an Entry register, respectively.

It should be kept in mind that head A moves along drum 16 in synchronism with the stepping of print head 12 with respect to document 13, thereby always being positioned adjacent a track on drum 16 that directly corresponds to a particular horizontal position on document 13. Head B, on the other hand, is controllable by the auxiliary escapement mechanisms 52 to move in synchronism with head A under certain conditions or move ahead as indicated at 76 for sensing format and program information or stored data under other circumstances, as may be required.

PROGRAMMING AND FORMAT CONTROL

An inspection of invoice 13, FIG. 2b, shows that the printed matter on the invoice is arranged in fields, as in a conventional manner. Each field is of variable length depending upon the layout of the invoice and comprises a particular number of horizontal printing positions or locations of print head 12. As an example, the "Ordered" field may comprise four (4) printing positions to accommodate quantities ordered from 1 to 9999. The "Amount" field, as another example, may comprise six (6) horizontal printing positions, plus decimal.

Drum 16 has a sufficient number of tracks horizontally to accommodate the maximum number of printing positions likely to be encountered on invoice 13 or other documents used during accounting procedures. In a typical case, this might be 85 tracks. The tracks on drum 16 are allocated to horizontal fields that correspond exactly to the fields encountered on invoice 13. For clarity, the headings on invoice 13 associated with particular program and format fields are given on drum 16 adjacent the field to which they apply.

The first portion of invoice 13 of particular interest involves Quantity Ordered, Shipped, Back ordered; Unit of measure; Product number; Description; Price; and Amount. The format and program information applicable to this portion of invoice 13 is entered by the operator in one of the mode locations on drum 16. As illustrated in FIG. 2b, in this case, the format and program information for this portion is stored in Format 1-Program 1 selected by timing pulse 71 on drum 16.

Another portion of invoice 13 that is of interest is the Gross Amount field that is controlled from a format and program standpoint by information entered into and stored in Format 2-Program 2 under control of timing pulse 72 on drum 16.

The final printed portion of invoice 13 including Discounts, Tax, Tax Amount, Shipping Charge, and Invoice Total, is set up in the illustrative example for format and program control by Format 3-Program 3 under control of timing pulse 73.

As printing of invoice 13 proceeds therefor, Level 2 controls all of the format and programming requirements for preparing the document. Level button 60 is positioned to respond to timing pulse 70 for selecting Level 2 throughout the preparation of invoice 13. As the various portions of invoice 13 are encountered during its preparation, the operator of the equipment moves mode button 61 to position head D for a response to one of the timing pulses 71, 72, or 73, thereby selecting one of the Format-Program areas, 1, 2, or 3, as required. Format-Program area 4 is not required in the present instance.

The field control concept utilized in the preferred embodiment is predicated on the following arrangement of format and program symbols:

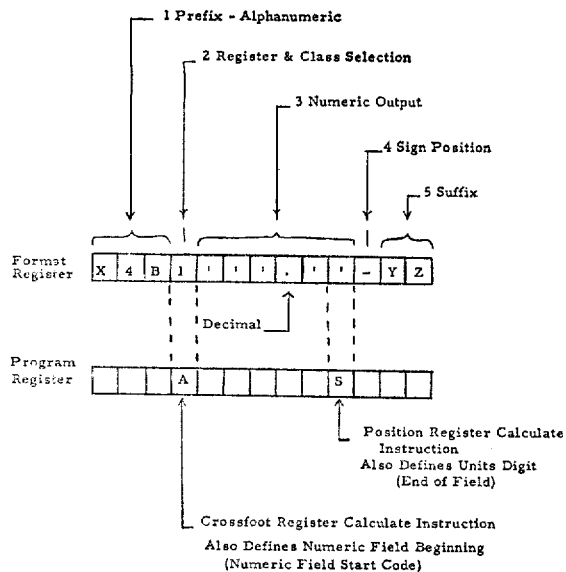

The following program codes are used in the equipment:

PROGRAM CODES

| Code | Function | Location |
| --- | --- | --- |
| Class: | | |
| 1 | Enter | Format Register. |
| 2 | Sub Total Program Register. | |
| 3 | Total Program Register. | |
| 4 | Sub Total Crossfooting Register. | |
| 5 | Total Crossfooting Register. | |
| 6 | Product Print | |
| Numeric Output: | | |
| / | Search Instruction | Format Register. |
| . | Decimal Location | Numeric Output Positions. |
| - | Sign | |
| Automatic Functions: | | |
| T | Tabulate (Tab) | Format Register. |
| C | Carriage Return | |
| * | Stop | |
| Program: | | |
| A | Add | Program Register. |
| N | Non Add | |
| T | Transfer | Crossfoot-First Position. |
| S | Subtract | Position Register-Units Position. |
| M | Multiply | |
| D | Divide | |
| F | Printer Function | |

The field control concept with heads A and B having an inherent positional relationship with respect to document 13 greatly simplifies format control during printing, as well as programming requirements during the preparation of invoice 13, or other documents that may be required.

The format control information in a selected format register is effective to control operation of the printer as well as initiate various operations in the accounting equipment automatically. In addition, the format registers on drum 16 receive characters that are repetitive in nature such as "Gross Amount," or "Discount," such information being automatically recognized to print the corresponding statement on the document when the appropriate point is reached.

The program registers are effective to control arithmetic operations in the equipment including Add, Subtract, etc., and to control functional response of the equipment during document printing.

Certain of the control information may or may not be entered for subsequent use, as desired. As an example, the prefix information indicated as entered in the format register in the "Field Control" diagram previously given is not used in the example discussed herein. However, such prefix information could be provided, under some circumstances, for controlling printing and programming operations of the equipment. Usually, the prefix characters are printed out exactly as they appear in the format register and may serve to categorize or identify the numeric portion of the register when printed on the document.

PROGRAMMING CONTROL

FIGS. 3a, 3b, 3c, and 3d represent block diagrams of program control and instruction circuits that are useful in the apparatus of FIGS. 1, 2a, and 2b.

The circuit in FIG. 3a supplies programming gating pulses, designated PC0 through PC7, that step the equipment through eight program steps during any selected mode of operation. The circuit is under control of a control switch 80, a program counter 81, and a decode switch 82 that supplies the PC0-PC7 outputs.

FIG. 3b represents in block form the circuits required for decoding any of the print instructions that precede a numeric field such as those relating to class of print operation, that is 1. Enter, 2, Subtotal Position Register, etc. previously given in the program code chart. The numeric print instruction codes are supplied to a control switch block 83, to a print instruction store 84 and a print instruction decode block 85 for supplying the proper gating to the machine circuits.

The arithmetic instruction decode circuits are represented in FIG. 3c as comprising a control switch 86, an arithmetic instruction store 87 and an arithmetic instruction decode block 88. This circuitry gates the arithmetics in response to program codes such as, A-Add, N-Non Add, etc. that are stored in the program lines on drum 16 and that may be entered by the operator in accordance with the program code chart given previously.

Figure 3D:
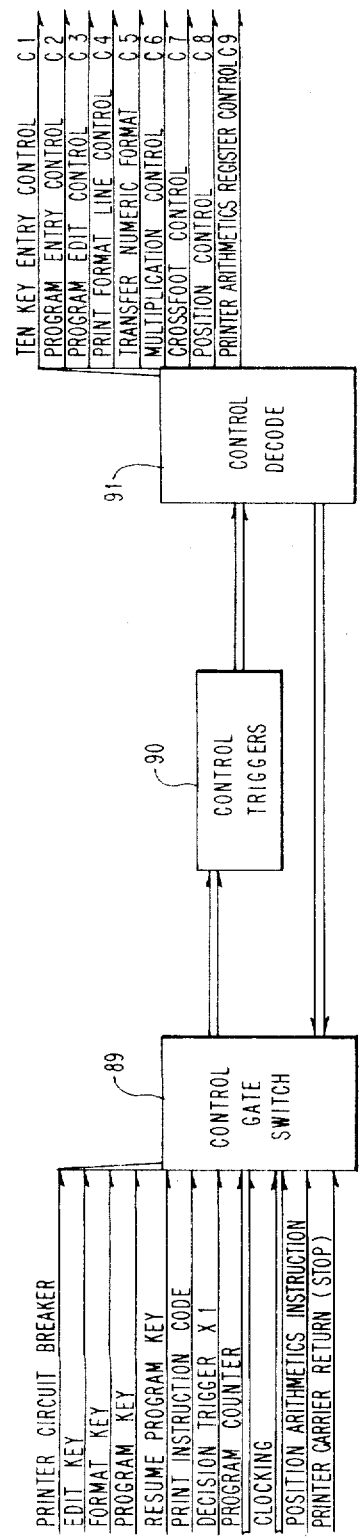

FIG. 3d represents circuitry including a control gate switch 89, a control store 90, and a decode block 91 for supplying mode gates to establish a desired mode of operation in the equipment in connection with inputs to switch block 89. The inputs to switch block 89 include manually derived inputs emanating from control key areas such as Edit, Format, etc. on the keyboard 2, FIG. 1, as well as internally derived input from programming decisions encountered during operation of the equipment.

CLOCKING AND GATING

Figure 4:
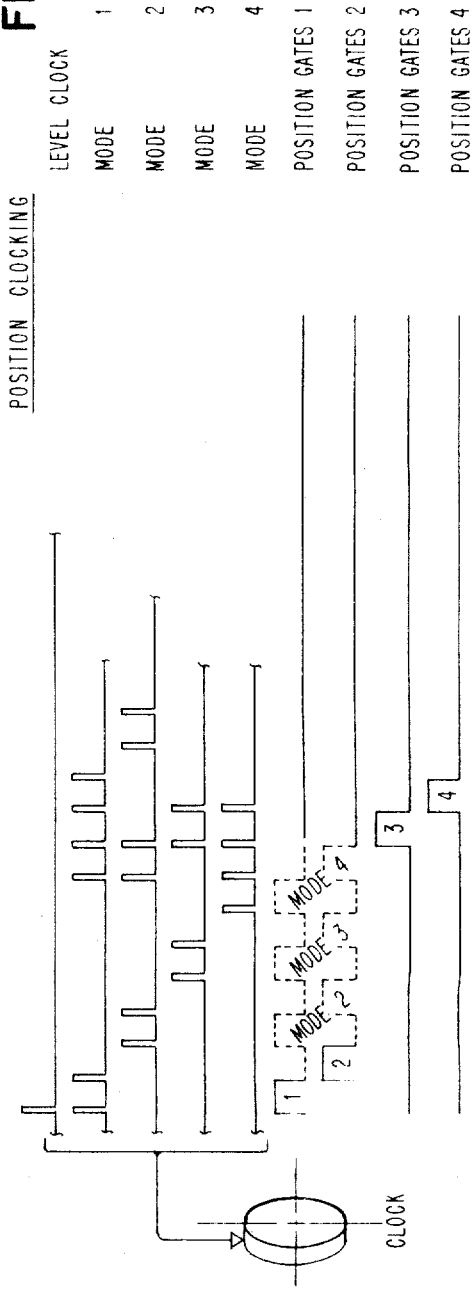
FIG. 4 is a clocking and gating diagram.

Typical clocking and gating pulses derived from the timing tracks on drum 16, FIG. 2b are illustrated in FIG. 4. If Level 2 is selected by manipulation of button 60, each time head C encounters the timing track 70, a pulse is derived to represent the beginning of Level 2 as shown on the first waveform line in FIG. 4. Individual mode segments within Level 2, or any selected level, are represented by a succession of two pulses arranged in the timing tracks 71-74. In addition, Position Register 1 and Position Register 2 locations are selected by individual pairs of pulses associated with any of the timing tracks 71-74. These locations are also referred to as Position Total 1 and Position Total 2. The first pulse encountered by Level head C represents the first bit in the selected level. The first pulse encountered by Mode head D represents the first bit of an eight bit character in the mode selected by manipulation of button 61, FIG. 2b.

The pulses recognized by heads C, D, and E, which is related to the bit clock track, are utilized in the circuits of FIG. 5 to supply Head A Position gates 1, 2, 3 and 4 and Head B Position gates 1, 2, 3, and 4.

Position gates 1 and 2, FIG. 4, will occur at a time that is dependent upon the mode selected by the operator. Position gates 3 and 4 always occur at the same relative time, irrespective of the mode selected.

Certain programs involve writing or reading information with head A, while other programs involve reading by head B. Since Head B is displaced one level (one sector) from head A in relation to drum 16, and since the same level information is required to be written or read during any document preparation sequence, it is necessary to delay the development of Position gates for head B for one level. This is performed under control of the Head A Gate trigger 93 and the Head B Gate trigger 94, FIG. 5. The circuits of FIG. 5 include a Bit counter 95 and a switch block 96 for developing Bit gates 1 through 8 and a switch block 96 for developing Bit gates 1 through 8 that control accessing of individual bits of information.

GENERAL DESCRIPTION OF ENTRY AND OUTPUT PROCEDURES

A number of entry and output procedures will first be described in a general way in connection with FIGS. 6 through 11 and then in detail in connection with FIGS. 12 through 29.

The primary procedures of interest in the present equipment are as follows:

|  | Figure |
|---|---|
| (1) Format or Program Entry | 6 |
| (2) Edit Control | 7 |
| (3) Ten Key Entry | 8 |
| (4) Print Format Line | 9 |
| (5) Positon Storage or Numeric to Arithmetic Registers | 10 |
| (6) Arithmetic Registers to Position Storage With Printing | 11 |

FIGURES 6 through 11 represent the data flow and controls exerted during the six entry and output procedures indicated.

*Format or Program Entry.*—The data flow for Format or Program Entry is shown in FIG. 6. Prior to using the equipment for the preparation of any documents, such as document 13, FIG. 2b, it is necessary for the operator to enter the format and program information on drum 16 that will be necessary to perform the operations required for preparing the document. To do this, the operator manipulates Level button 60 and Mode button 61 to select the level and mode desired on drum 16 and further identifies either the format register or the program register within the selected mode by depressing the appropriate key in control key area 6 on keyboard 2, FIG. 1. When the level, mode, and format or program register have been selected, the operator then depresses appropriate buttons on printer keyboard 3 to enter in the selected register the desired format or program information, as the case may be. The characters, whether numeric or alphanumeric are entered according to the field control and program code charts previously given.

As each key is depressed, the contacts R1, R2, R2a, etc., in printer 10 close and corresponding code combinations are entered in parallel in shift register SR1. When head A reaches the proper peripheral location for the selected format or program register on drum 16, the clocking and position gate circuitry gives an indication which results in the transfer of the character code combination to the head A write circuits, whereupon the character entered is stored in a location on drum 16 that corresponds to the selected format or program register and that also is inherently correlated with the horizontal position of print head 12 with respect to document 13.

The electronic and mechanical actions involved are timed so that the electronic action, that is, the recording of information by head A in the appropriate horizontal position occurs prior to the escapement of print head 12 and head A to the next horizontal position. As an example, in a typical apparatus, the printer cycle is predicated on an interval of 60–66 milliseconds while a drum revolution comprises an interval of 30 milliseconds. Under these conditions, the electronic action is completed prior to the completion of the mechanical printer actions involved. Escapement may be set up to take place in the last portion of the printer cycle.

*Edit Control.*—In FIG. 7, provision is made for editing previously entered format or program information when the Edit key in control key area 6, FIG. 1, is depressed. The format or program register to be edited is selected in a manner comparable to that followed during the format or program entry procedures previously discussed in connection with FIG. 6. During the Edit operation, the format or program information selected is printed by printer 10 so that a direct visual check can be made of the contents of the register selected. The Edit procedure is initiated by depression of the Program Start button in control key area 9, FIG. 1. As print element 12 moves across document 13 and head A moves along drum 16, individual characters are sensed on drum 16 and supplied to shift register SR1 serially by bit. When a complete character combination has been accumulated in shift register SR1, the Printer Drive control is activated and the appropriate printer magnets R1, R2, R2a, R5, T1, T2, and Check are energized to rotate and tilt print element 12 for printing the selected character. If a functional character is encountered during this procedure, the appropriate operational magnet in printer 10 is actuated to effect the function required, such as, Carrier Return, Space, and so on.

*Ten Key Entry.*—The procedure illustrated in FIG. 8 involves the entry of a numeric character from the numeric keyboard 4 by depression of one of the keys designated 0–9. Whenever the format register, program register, or edit keys are not depressed, the equipment is in a status which automatically establishes circuits for Ten Key Entry procedures. Depression of any of the numeric keys 0–9 closes associated contacts in the numeric keyboard 4 that initiates control for transferring a coded combination representing the numeric key depressed in parallel into shift register SR1. When the character has been entered and controls initiated, the Entry register associated with head J, FIG. 2b, is searched to determine the last previously entered character position either by associated character marks in particular bit positions within a character location, or by counting techniques. When an unoccupied character position has been located in the Entry register on drum 16, the Entry register Write circuit, FIG. 8, is activated to shift the code combination in shift register SR1 to head J for entering the character on drum 16. The equipment then reverts to its idle status and awaits the entry of the next numeric character from keyboard 4.

*Print Format Line.*—The circuits in FIG. 9 concern the operation involving the printing out of repetitive information that was previously stored in a selected format register. In the assumed example, the term "GROSS AMT" is stored in format register 2. The term "DISC" is stored in format register 3 on drum 16. The format register required at a particular time during preparation of document 13 is selected in the usual manner by positioning Level button 60 to Level 2 and Mode button 61 to Mode 2 or Mode 3 as required. Depression of the Program Start key in control key area 9, FIG. 1, initiates the operation.

It is necessary during this operation to search the fields established on drum 16. Head A Position gate 1 gates the format character into shift register SR1 and Head A Position gate 2 gates the program information from the associated program register into shift register SR2. The characters entered into shift registers SR1 and SR2 are decoded to determine whether an actual program field is involved or a descriptive field such as those containing the words "GROSS AMT" or "DISC." This is done primarily by analyzing the contents of shift register SR2 to determine whether an arithmetic or other internal program is indicated or whether a printer function indicated by the presence of the character "F" is involved. If a printer operation, including the printing of a character or a functional operation, is indicated, the operation required is performed by energizing the printer magnets under control of Printer Drive Control, FIG. 9. As the operation for any character is completed, printer element 12 escapes and head A moves to the next horizontal location on drum 16 to detect the next format and program characters.

Figures 10, 11:
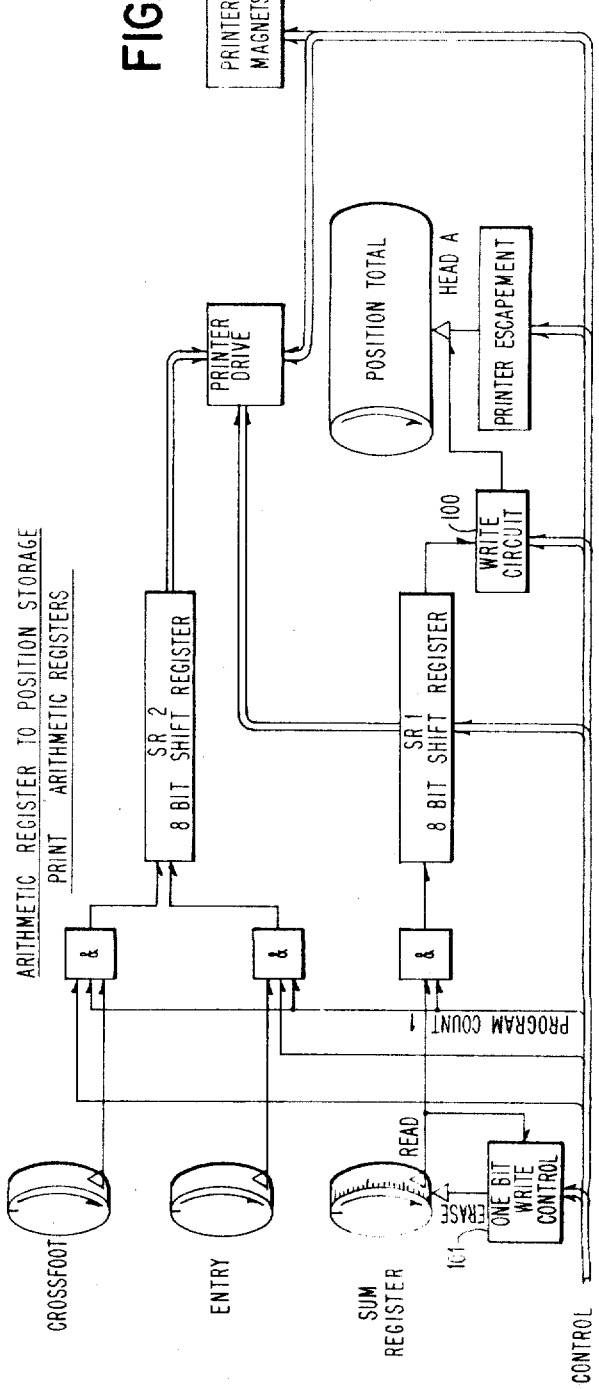
FIG. 10 illustrates data paths during transfer of numeric format or position storage to arithmetic registers.
FIG. 11 represents transfer of information of arithmetic registers to position storage together with printing.

If a numeric operation is indicated during the process of reading the characters from drum 16, the operation is transferred to the circuits indicated in FIG. 10, to transfer the numeric format which involves the transfer of the characters stored in the selected format register or position register to either the Entry Register or the Sum Register.

*Transfer Numeric Format and Position Storage to Arithmetic Registers.*—The circuits of FIG. 10 concern the transfer of the numeric format stored in a selected format register including decimal (.) indication as well as the transfer of position totals to the Entry and Sum registers associated with heads J and H, respectively.

The first thing done during this procedure is to read the format character into shift register SR1 to determine whether or not it is a decimal character. When this determination has been made, Position register 1 is automatically selected and the character in Position register 1 is then entered into shift register SR1. The contents of the position register for the selected level, in this case, Level 2, are transferred to unoccupied positions in the Sum register by activating head H. The characters contained in Position register 1 are entered in the Sum register during individual cycles of rotation of drum 16. Position register 2 may be transferred to the Entry register, if it is desired to add the contents of Position register 1 to Position register 2.

If a decimal point (.) is encountered, it will be printed. In this event, the position register is bypassed and the decimal character is written into the Sum register. As each character is entered in the Sum register, the Program Count block designated 99, in FIG. 10, is advanced.

Concurrently with the transfer of information from head B to shift register SR1, characters read are also entered into shift register SR2. This is done in order to determine the end of the numeric format field. The controls are advanced to initiate the arithmetic program recognized during the scanning of head B.

Referring again to FIG. 10, the contents of Position register 2 are entered through shift register 2 into the Entry register on drum 16 concurrently with the Position register 1 through shift register SR1 to the Sum register whenever it is desired to transfer the contents of Position register 2. Ordinarily, however, the contents of the two different position registers are transferred through shift register SR1 to the Sum register or through shift register SR2 to the Entry register during separate operations.

*Arithmetic Registers to Position Storage with Printing.*—Following arithmetic operations, the contents of the arithmetic registers are transferred to either the Position register 1 (Position Totals) or Position register 2 (Final Totals), as required. Normally, Position register 1 is read during each document preparation sequence, and the Position register 2 contents are not printed until the end of an entire day's operation. This is under control of the Position Total 2 (PT 2) key in control key area 8, FIG. 1.

Considering FIG. 11, information is transferred from the arithmetic registers to one of the position locations, that is, Position register 1 or Position register 2, in the selected level. The arithmetic registers are considered to be either the Sum register, the Entry register, or the Crossfooting register. The Sum register is scanned for the first character available, identified by a mark, for example, and as soon as the first character is recognized, it is transferred to shift register SR1. The beginning point of the arithmetic registers is dependent upon the level selected. For example if Level 2 is selected, the beginning points of the Sum, Entry, and Crossfooting registers is located at the beginning of the Level 2 timing track. If the quantity ordered, "200" on invoice 13, is keyed in, the number "2" is entered at the beginning character position determined by timing track 70. The other digits in the number are entered in subsequent character locations. In FIG. 11, it is assumed that the format information in the selected format register is contained in the Sum register at this time. The first character of format information, such as the number "1" under Quantity Ordered will occupy the first character location in the Sum register as determined by timing track 70 for Level 2. During transfer of the format information from the Sum register for use in the apparatus, the characters are continually read from the Sum register into the shift register SR1 and as soon as the beginning of the level 2 clock pulse 70 is recognized, the shifting of information ceases. At this time, the character in the shift register SR1 is the first format character that was stored in the Sum register. Also, the mark in the high order character position in the Sum register is erased so that the next character brought out will be the next character that contains a mark. If printing is required, then the contents of shift register SR1 are applied to the printer magnets either informational rotate and tilt, or operational magnets, to operate the printer. As soon as the printer has started its cycle, the next character stored on the drum is brought into the shift register and the electronics waits for a signal from the printer that the printer or functional cycle has been completed.

The contents on a character by character basis from the Crossfooting or Entry register are entered into shift register SR2 depending upon the program selected.

A Position Total 1 in the Sum register will operate the printer drive switch and printer magnets from the contents of the shift register SR1. A Position Total 2 amount in the Entry register or a crossfooting amount in the Crossfooting register will operate the printer drive and printer magnets through shift register SR2.

As printing takes place and the contents of the Sum register, for example, are recognized for printing, they are also applied through Write circuit 100, FIG. 11, to energize head A for entering the same information in the position register that has been selected. As print head 12 escapes, therefore, a new horizontal location in the position register becomes available for storing another character of information. Decimal points (.) stored in the Sum register are transferred as other characters and printed by print element 12. They are also transferred to the position register total location.

The block designated 101, FIG. 11, provides recognition of the marks in the character positions in the Sum register in order to determine when all marks have been erased and the end of the amount stored in the Sum register has been reached.

DETAILED ENTRY AND OUTPUT PROCEDURES

The detailed entry and output procedures will be discussed by reference to FIGS. 12–29 in connection with the previously discussed FIGS. 6–11.

FORMAT OR PROGRAM ENTRY

Figure 12:
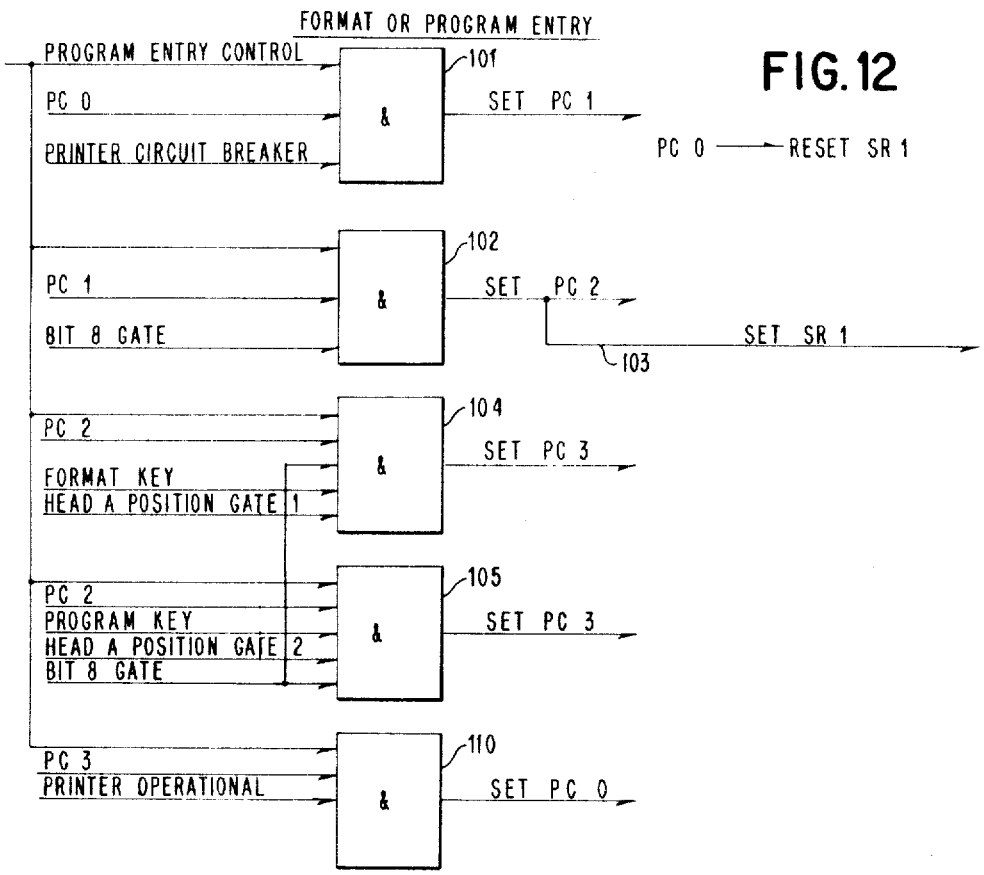
FIGS. 12 and 13 are concerned with program entry control.

Depression of either the Format register or Program register key in control key area 6, FIG. 1, supplies a Program Entry control signal to And (&) circuit 101, FIG. 12. Initially, the program counter 81, FIG. 3a, has a setting of 0. As soon as the printer cycles, a circuit breaker impulse to And circuit 101 develops a Set Program Count 1 output to step program counter 81 to a setting of 1. The typewriter circuit breaker impulses can be derived from one of the circuit breakers, such as C1 or C2.

Program Count 1 with a Bit 8 Gate signal conditions And circuit 102 which supplies a Set Program Count 2 output and a signal on line 103 to set shift register SR1 with the code configuration for the character that is entered by the operator.

Since the format register and the program register occupy different segments within a selected mode, such as the mode detemined by timing pulse 71, FIG. 2b, it is necessary to make use of different gates in each case to insure that characters of information entered during the entry procedures are written into the proper location on drum 16. This is done by using Head A Position gate 1 to gate And circuit 104 and Head A Position gate 2 to gate And circuit 105, FIG. 12. Either And circuit 104 or 105 provides an output to set the program count to 3.

Figure 13:
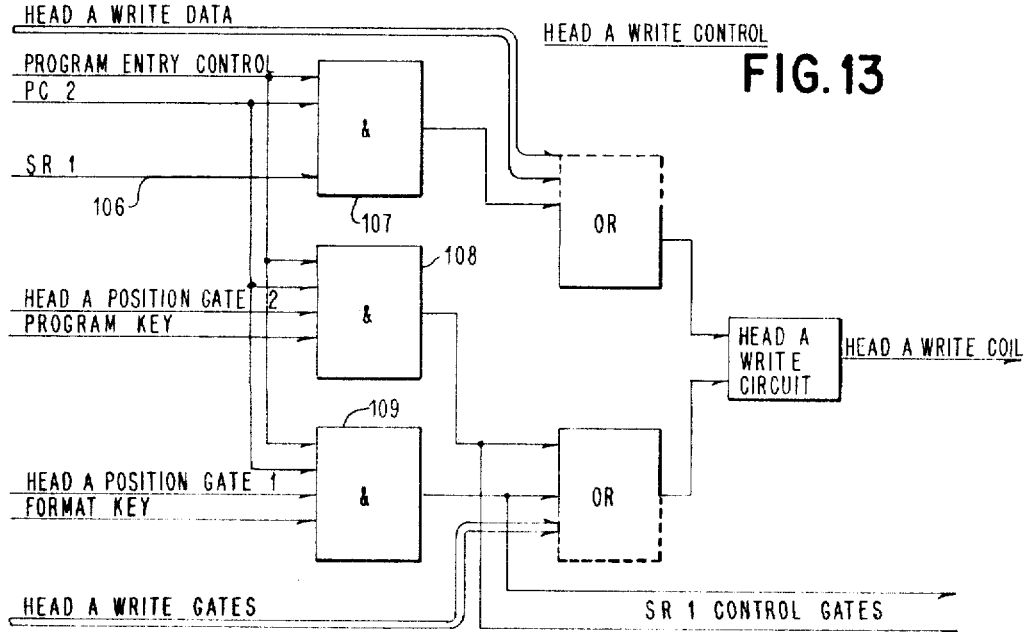

The circuitry necessary to gate head A for writing a character of information in either the format or program register selected is shown in FIG. 13. Shift register 1 contents are reflected on line 106 to And circuit 107 which is also gated by Program Count 2 and Program Entry control. A Program key depression with Head A Position gate 2, gates And circuit 108, or depression of the Format key in connection with Head A Position gate 1 to And circuit 109, insures the selection of the proper character location in either the program register or the format register, respectively.

As a character is entered, it is printed by print element 12 and printer 10 operates typewriter escapement 37 to move print element 12 to the next printing position and to concurrently move head A to the next recording track on drum 16. The recording of any character printed by print element 12 in the associated track on drum 16 occurs prior to the escapement action. A Typewriter Operational signal in conjunction with a Program Count 3 level gates And circuit 110 to set the program counter to 0 in readiness for the next program sequence.

DETAILED PROGRAM EDIT CONTROL CIRCUITS

Figure 14:
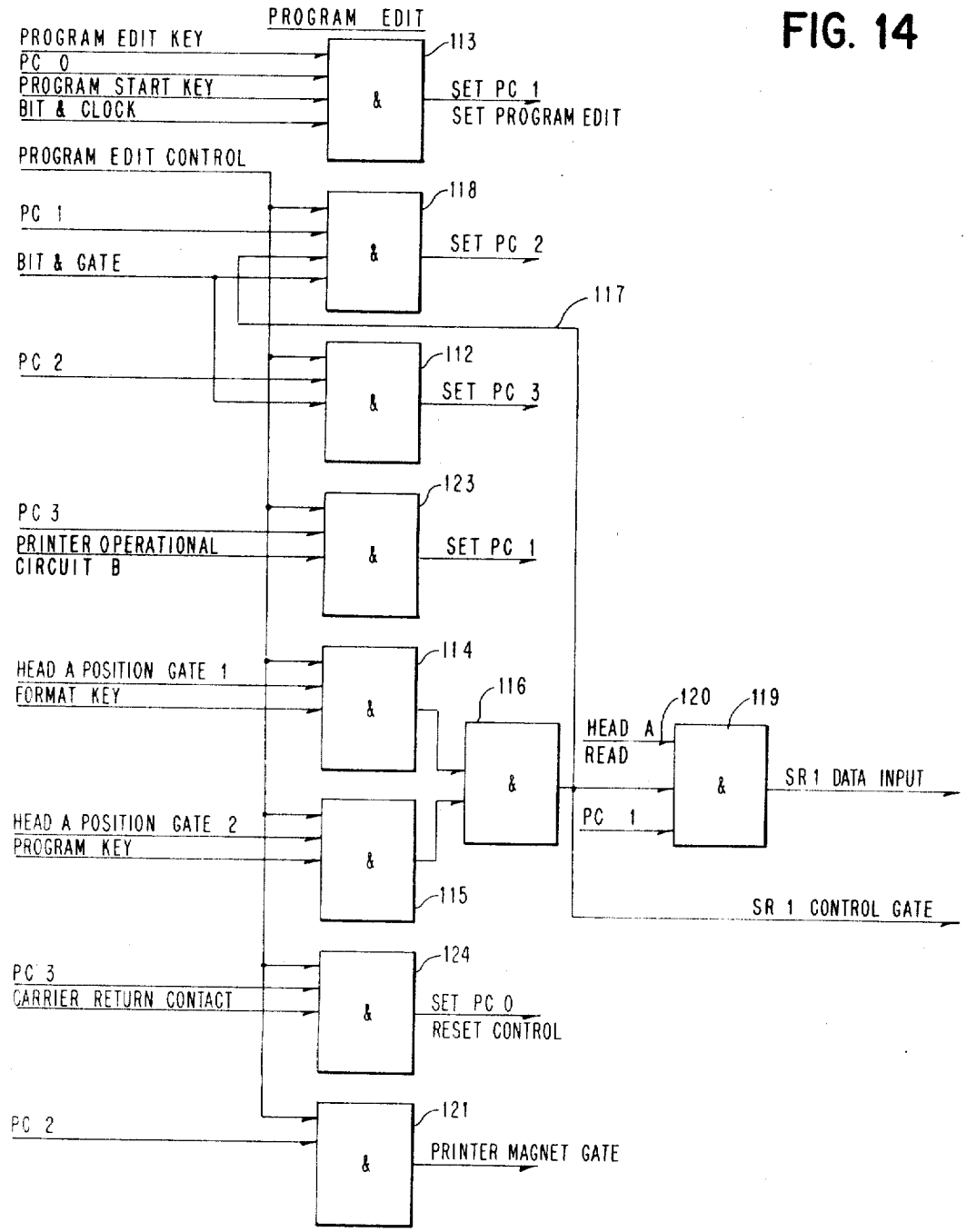
FIG. 14 represents detailed circuits for program editing.

The detailed operation for editing of either the format or program registers is provided in FIGS. 7 and 14. Depression of the Program Edit key together with the Program Start key to And circuit 113, FIG. 14, sets the program counter to 1. This also initiates a Program Edit control signal from the decode block 91, FIG. 3d. The Program Edit control line returns to FIG. 14 to gate a number of And circuits in the figure. During the Edit operations, information stored in the program register or format register on drum 16, as selected, is transferred character by character to shift register SR1 to operate the printer, FIG. 7. The proper head A position gates are again selected to insure the reading of the proper register on drum 16 by gating one of the And circuits 114 or 115, depending upon whether the Format key or the Program key has been depressed. An output from Or circuit 116 by line 117 gates And circuit 118 with Program Count 1 and Bit 8 Gate to step the program count to 2. Also, shift register SR1 is gated through And circuit 119 so that the data read by head A on line 120 enters shift register SR1.

Program Count 2 through And circuit 121 gates shift register SR1 to the printer for printing a character or to perform a printer operation Bit operation. Also, at Bit 8 Gate time, And circuit 122 furnishes an output to set the program counter to 3. At Program Count 3, a Typewriter Operational signal from the typewriter circuit breaker gates And circuit 123 to restore the program counter to 1. This indicates that print element 12 and head A have moved to the next horizontal position with respect to document 13 and drum 16, respectively, and that the next character on drum 16 can be entered into shift register SR1 for printing or functional operation of the printer.

Print element 12 and head A continue to escape with the recognition of characters for printing, spacing, or functional operations of the printer until the end of the line is reached. At this point on drum 16 is stored the automatic function symbol "C" representing a carrier return operation. The carrier return operation is performed by printer 10 with print element 12 being restored to the left hand margin and head A again returning to its home position with respect to drum 16. The closure of the Carrier Return contact in connection with a Program Count 3 level to And circuit 124, FIG. 14, sets the program counter to 0 and terminates the Edit operation.

DETAILED TEN KEY ENTRY PROCEDURES

The procedures for Ten Key Entry are illustrated in FIGS. 8, 15, 16, and 17. It is now assumed that the format and program control information has been entered in the appropriate format and program registers on drum 16, that they have been edited by the editing procedures discussed above, and that the equipment is now ready for the entry of information through the numeric keyboard 4 and from printer keyboard 3 for preparing invoice 13.

Figure 15:
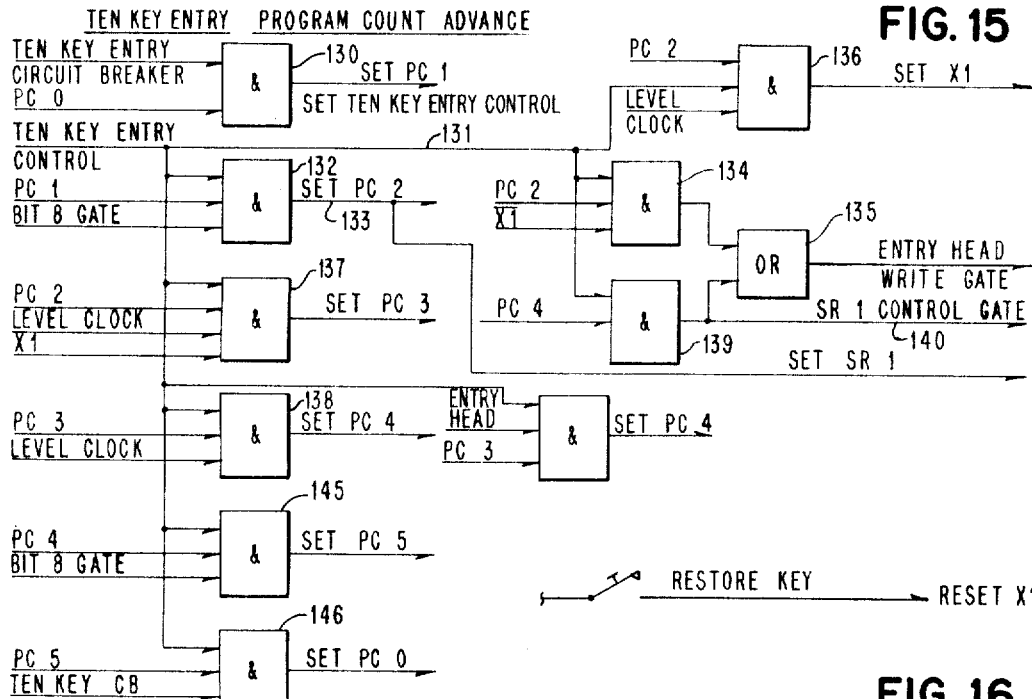
FIGS. 15, 16, and 17 are detailed circuits for ten key entry.
Figure 16:
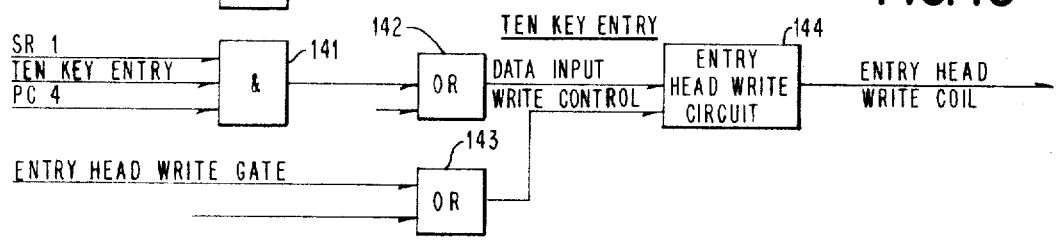

Referring to FIG. 15, with the program count at 0 and the closure of a circuit breaker in numeric keyboard 4, And circuit 130 is gated to set the program counter to 1 and to establish the Ten Key Entry control level from control block 91, FIG. 3d. The Ten Key Entry control line 131 gates the various circuits on FIG. 15.

A Program Count 1 input in connection with a Bit 8 Gate to And circuit 132 provides a Set Program Count 2 output and a Set Shift Register SR1 output on line 133. The depression of one of the ten keys on numeric keyboard 4 closes associated contacts in combinations representative of the keys depressed. Therefore, at Program Count 1, shift register SR1 is set according to the contact closures in numeric keyboard 4. With the program counter at 2 and a Not X1 to And circuit 134, head J associated with the Entry register on drum 16 is gated to erase the contents of the Entry register by line 135.

When the Level timing pulse in track 70, FIG. 2b, is encountered, trigger X1 is set on. This is done through And circuit 136, FIG. 15. The program counter is stepped to 3 by And circuit 137.

With the program count at 3, the equipment awaits the recognition of the Level clock again, at which time And circuit 138 is gated to set the program count to 4. Program Count 4 through And circuit 139 gates shift register SR1 by line 140 and Entry head J by line 135. The actual circuits involved include And circuit 141, Or circuits 142 and 143, and the Entry head write circuit 144, FIG. 16.

In FIG. 15, Program Count 4 with Bit 8 Gate conditions And circuit 145 to set the program count to 5. Program Count 5 with Not Ten Key circuit breaker conditions And circuit 146 to set the program to 0. The Not Ten Key circuit breaker signal is comparable to an operational signal from printer 10.

Figure 17:
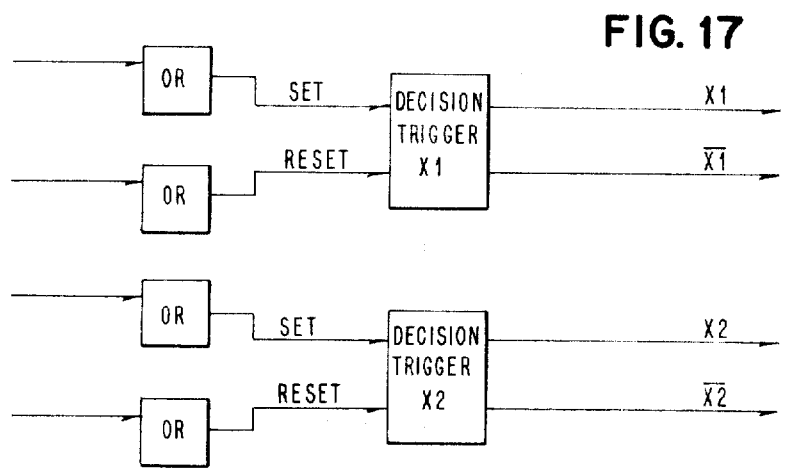

The circuits include two decision triggers X1 and X2, FIG. 17. Trigger X1 is used in the Ten Key Entry procedures and trigger X2 is used in other circuits to be discussed later.

DETAILED PRINT FORMAT PROCEDURES

Figure 18:
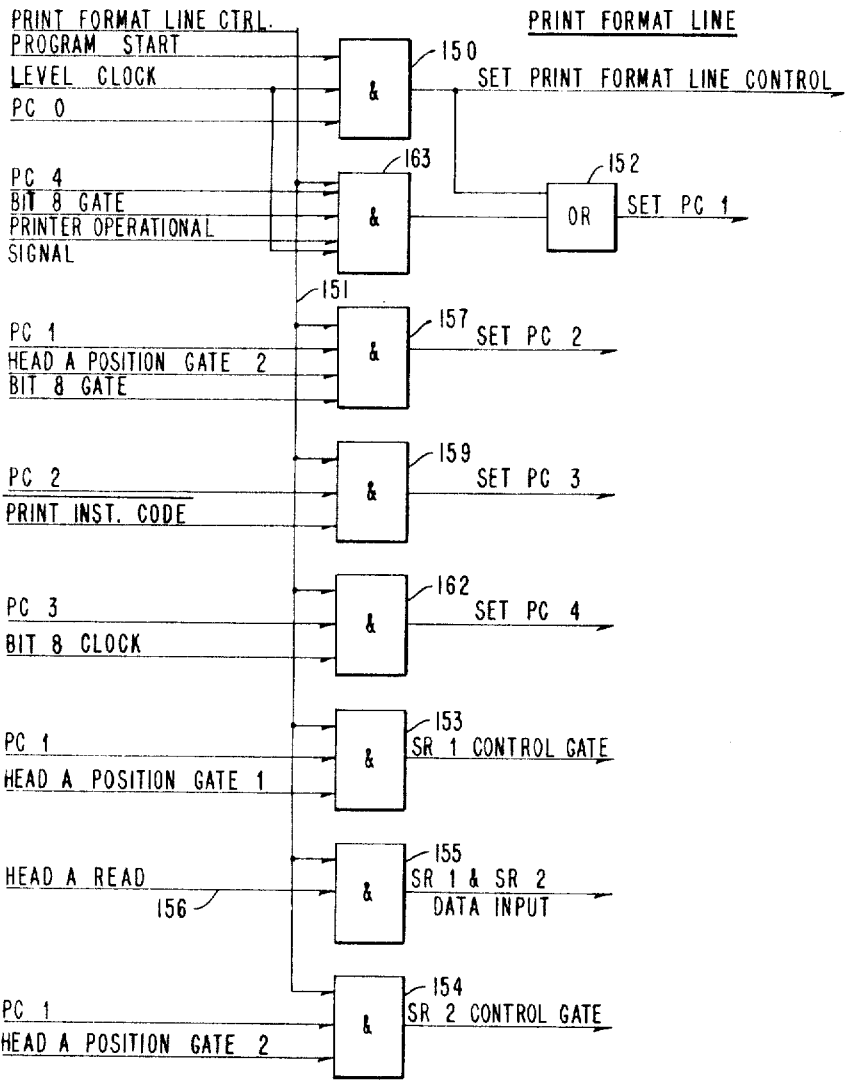
FIGS. 18, 19 and 20 are concerned with accessing and printing of format information.
Figure 19:
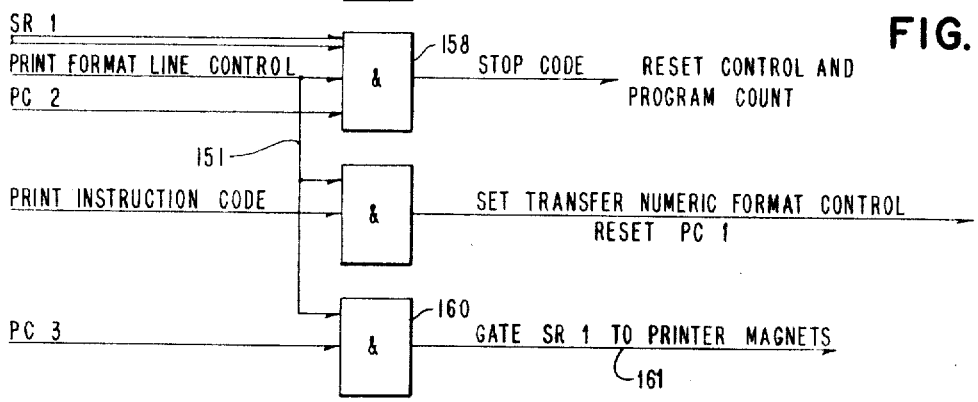

The procedure involved in printing stored information such as "GROSS AMT" and "DISC" stored on drum 16, or similar terms, is illustrated in FIGS. 9, 18, and 19. If it is desired to print the entire contents of the format or program register, then the edit procedures previously discussed are followed. The present procedures involves only the printing of stored terms, words, prefixes, suffixes, or similar terminology of repetitive nature that may be required during the preparation of accounting documents, such as invoice 13, FIG. 2b. However, the information stored in the associated program line on drum 16 is entered into the shift register SR1 for control purposes, FIG. 9.

Referring to FIG. 18, depression of the Program Start key in control key area 9, FIG. 1, together with a Program Count 0 and Level clock recognition conditions And circuit 150 to initiate a Print Format Line control from decode block 91, FIG. 3d. This is returned by line 151 to condition the various gates in FIGS. 18 and 19. The output through Or block 152 also sets the program count to 1.

The contents of the format register and the program register selected by the operator as determined by one of the timing pulses 71–74 in FIG. 2b are supplied to shift registers SR1 and SR2 under control of And circuits 153 and 154, FIG. 18. And circuit 155 supplies data to either of the shift registers depending upon which one is gated as data is developed on the Head A Read line 156. At Head A Position Gate 2 and Bit 8 time, And circuit 157 sets the program count to 2.

Each cycle a determination is made as to whether the character indicates the start of a format field, or whether the character indicates a stop condition and the end of the field. The format characters in shift register SR1 are decoded and a Stop code recognized by And circuit 158, FIG. 19. Whenever a Stop code is recognized, the controls are reset and the program counter is reset.

When a Numeric Field Start code is recognized, the Print Instruction store 84, FIG. 3b, is activated to supply one of the Print decode control signals from decode block 85, FIG. 3b.

Arithmetic instructions are decoded by the circuits indicated in FIG. 3c, according to the contents of shift register SR2. A Numeric Field Start code also initiates a Transfer Numeric Format control from the decode block 91, FIG. 3d. This is discussed separately below. The recognition of any code that is not a print instruction code in connection with Program Count 2 gates And Circuit 159, FIG. 18, to set the program count to 3. Program Count 3 conditions And circuit 160 to gate the contents of shift register SR1 to the typewriter magnets by line 161, FIG. 19. Program Count 3 with Bit 8 clock conditions And circuit 162 to set the program count to 4.

And circuit 163, FIG. 18, is conditioned by Level clock recognition, Program Count 4, Bit 8 gate, and typewriter operational signals to set the program count to 1 through Or block 152. Therefore, the reading of the next characters into the shift registers SR1 and SR2 awaits the completion of the printing or operation of the typewriter in response to the previously recognized character directed to the typewriter. As soon as print head 12 and head A have escaped to the next horizontal location, the next format and program characters can be read and acted upon.

Referring again to FIG. 19, the asterisk indicated in the program code chart previously given is recognized to stop the apparatus in preparation for a Ten Key Entry operation in the next field.

DETAILED PROCEDURES FOR TRANSFERRING STORAGE INFORMATION INCLUDING NUMERIC FORMAT TO ARITHMETIC REGISTERS

Reference is now made to FIGS. 10, 20, 21, 22, and 23 for detailed procedures concerning the transfer of numeric format information and position storage information to the arithmetic registers. FIG. 24 is related, but will be discussed in the next section.

This operation involves the transfer of information through shift registers SR1 and SR2 to the Sum register and Entry register locations on drum 16, as illustrated in FIGS. 2b and 10. Such transfer involves the control of head B which is movable from the normal position shown in FIG. 2b along the surface of drum 16 as indicated by the dashed outline 76, FIG. 2b. Such control of head B is derived from FIG. 20 by energization of magnets designated Escape, Backspace, Tabulate, and Carrier Return, all of which control the movement of carrier 32 and consequently the movement of head B through cable 27, FIG. 1.

Figure 20:
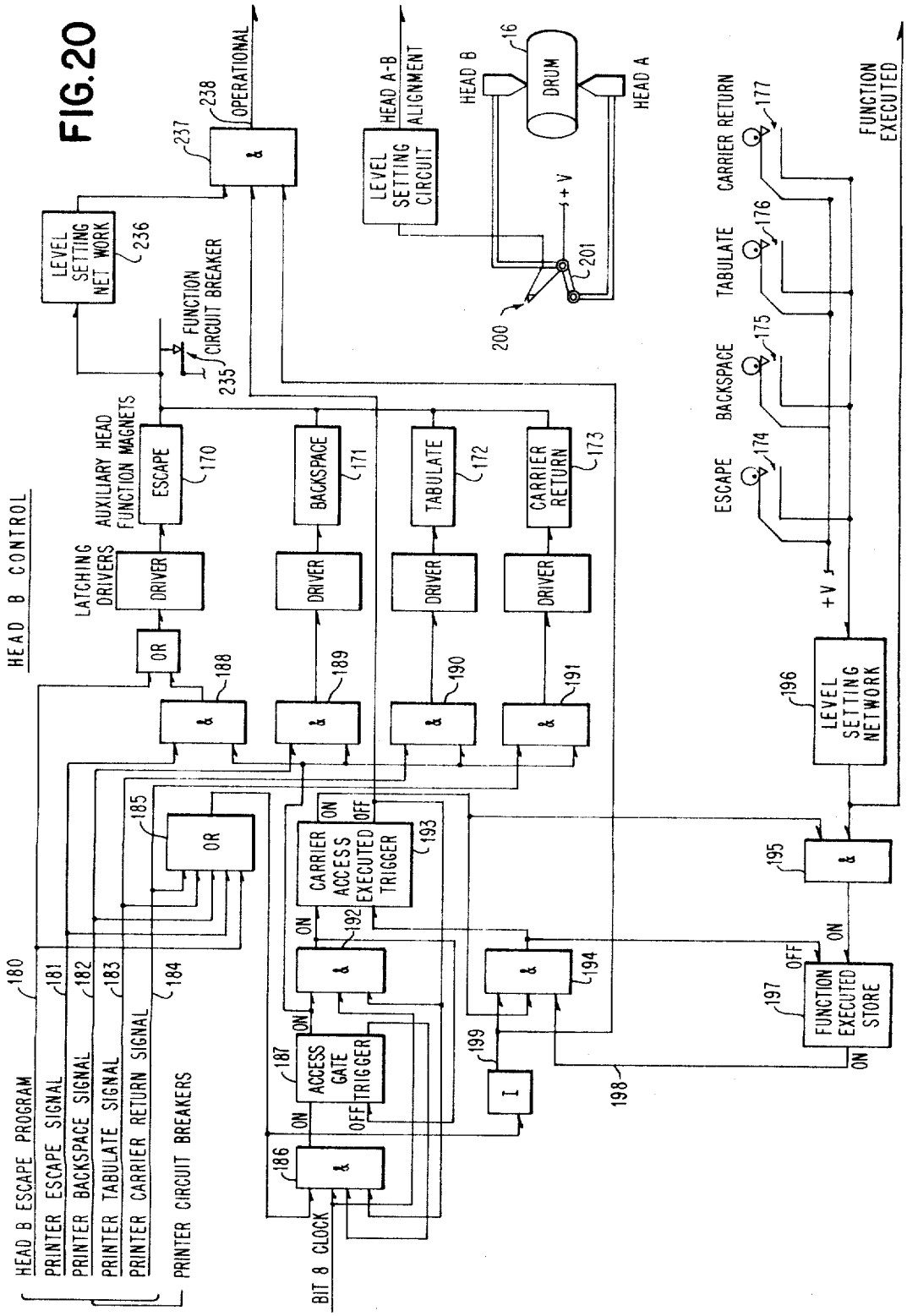

The circuits in FIG. 20 are operative to control head B to access information and to degate such access insuring that the movement of head B is accurately controlled. The functional magnets involved in FIG. 20 are designated 170, 171, 172, and 173. The initiation and completion of the functions involved are indicated by Escape contact 174, Backspace contact 175, Tabulate contact 176, or Carrier Return contact 177 in the auxiliary mechanism, depending upon the function selected.

Functions involving auxiliary head B are initiated by signals supplied on lines 180, 181, 182, 183, and 184, FIG. 20. A signal on any one of these lines supplies an output from Or circuit 185 which through And circuit 186 sets the Access Gate trigger 187 to its On condition. Trigger 187 conditions And circuits 188, 189, 190, and 191 to drive the function magnet 170–173 required for the particular function. When Access Gate trigger 187 is set to its On condition, this, in connection with a Bit 8 clock recognition, conditions And circuit 192 to set the Carrier Access Executed trigger 193 to its On state. Trigger 193 conditions one input of And circuit 194 and further conditions And circuit 195. Execution of the function involved is indicated by closure of one of the contacts 174–177 through the level setting network 196. At this time, And circuit 195 turns a Function Executed trigger 197 to its On state. The On state output on line 198 together with the drop of the control lines 180–184, as reflected through Inverter 199, conditions And circuit 194 to turn the Carrier Access Executed trigger 193 to its Off state and to also turn the Function Executed trigger 197 to its Off state.

In the lower portion of FIG. 20, a switch 200 is actuated by linkage 201 to indicate the alignment of head A and head B in the same horizontal location with respect to drum 16. This is useful in the control circuits, FIG. 3d, and insures head alignment prior to certain operations, such as Print Format Line.

During the present operation, characters in the selected format line are transferred as read by head B to shift register SR1 and characters in the selected program line are transferred as read by head B to shift register SR2. This operation is similar to that followed during format print procedures previously discussed.

Figure 21:
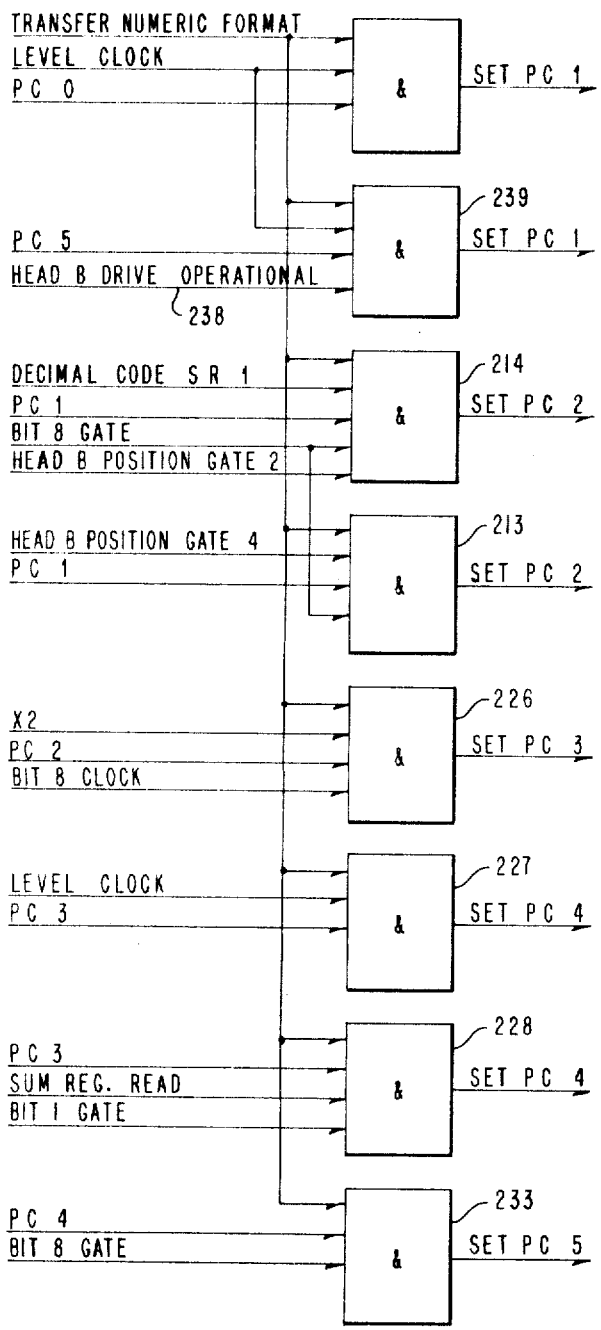
FIGS. 21, 22, 23, and 24 represent detailed circuits for the transfer of numeric format or position storage to arithmetic registers.
Figure 22:
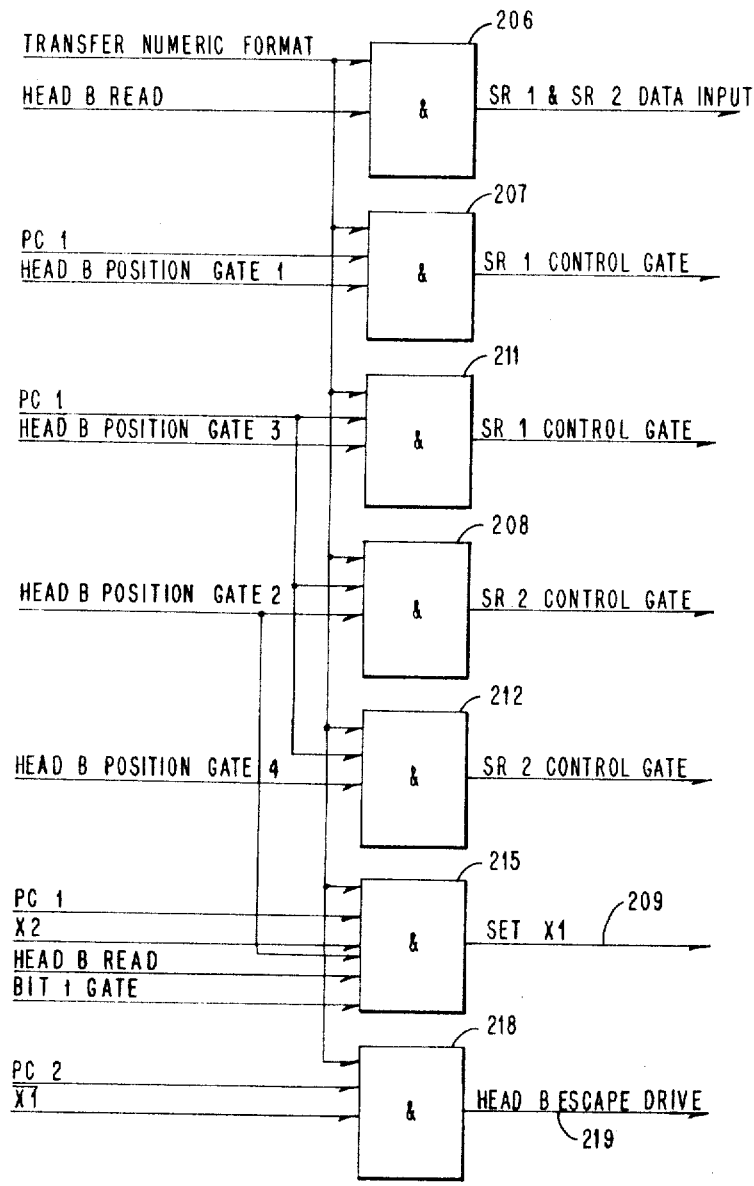

In FIG. 22, head B data is gated to shift registers SR1 and SR2 under control of And circuit 206. FIG. 21 illustrates the development of the program count levels PC1–PC5 that are used in the circuits of FIGS. 22 and 23. Shift register SR1 is specifically gated at Program Count 1 time by Head B Position Gate 1 through And circuit 207. Shift register SR2 is gated at Program Count 1 time by Head B Position Gate 2 through And circuit 208.

At Program Count 1 time, the contents of shift registers SR1 and SR2 are checked to determine whether or not the end of the field has been reached. If this is the case, the X1 trigger, FIG. 17, is set by line 209. Also, And circuit 210, FIG. 23, checks for the presence of a decimal code (.) in shift register SR1.

Following the entry and decoding of the characters in shift registers SR1 and SR2 from the format and program lines selected, the contents of position register 1 and position register 2 in the selected level are gated by And circuits 211 and 212, FIG. 22 under control of Head B Position Gates 3 and 4 to shift registers SR1 and SR2, respectively.

Head B Position Gate 4 conditions And circuit 213, FIG. 21 to set program count to 2. Considering the recognition of a decimal (.) code by And circuit 210, FIG. 23, such recognition also results in the setting of program count to 2 under control of And circuit 214, FIG. 21.

Referring again to And circuit 215, FIG. 22, one of the conditions for an output from circuit 215 is that the X2 trigger is in its On state. The X2 trigger, FIG. 17, is set to its On state when head B moves from the first position of a field and the X2 input for And circuit 215 insures that the program code in the first position of the field will not be recognized erroneously as an end of field indication. Whenever And circuit 215 sets trigger X1, the escapement of head B is inhibited since the end of the field has been reached.

This is indicated in FIG. 22 where a Program Count 2 and Not X1 is required for conditioning And circuit 218 to provide a head B escape drive control signal on line 219. At Program Count 2 time, Not X2 conditions And circuit 220, FIG. 23, to supply an erase gate on line 221 to erase the contents of the Sum register.

Figure 23:
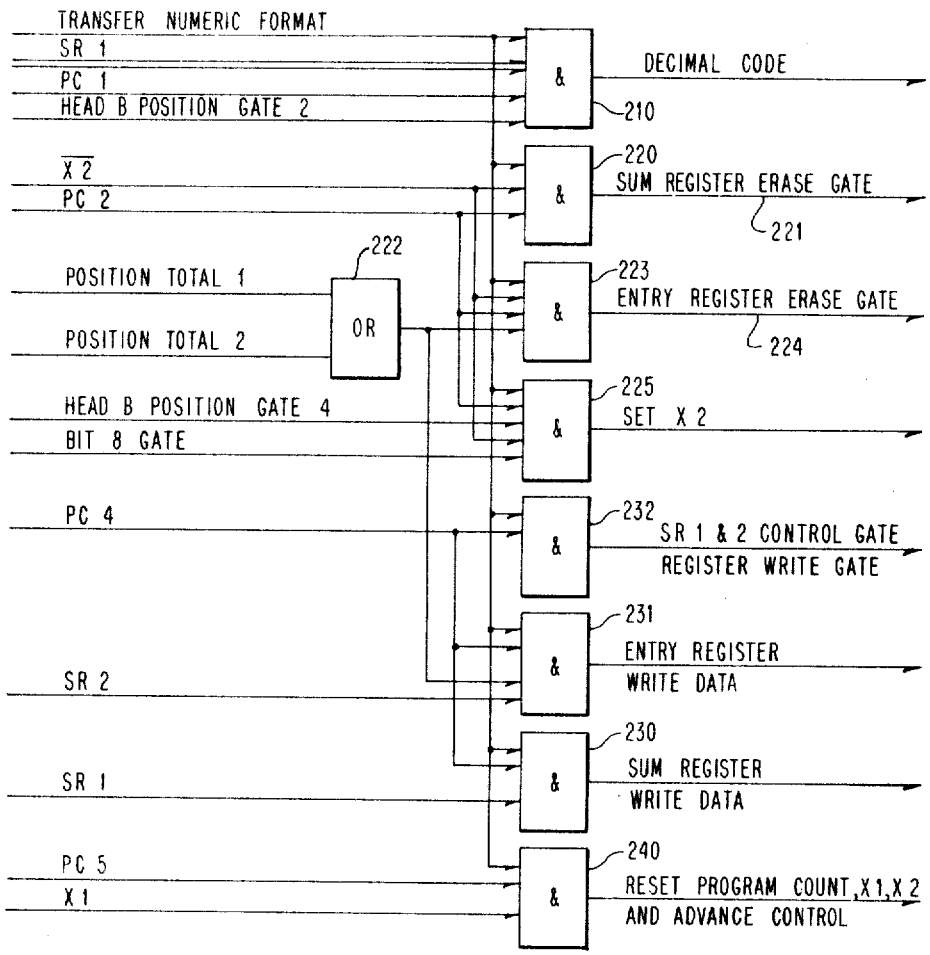
Figure 24:
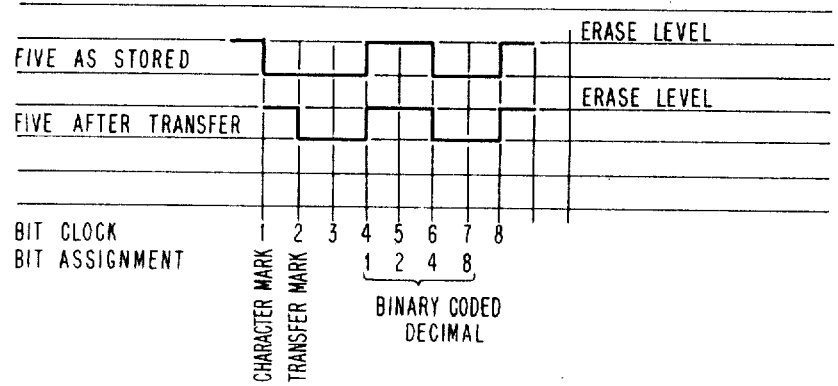

In FIG. 23, the occurrence of Position Total (Register) 1 or Position Total (Register) 2 gating through Or block 222, conditions And circuit 223 to supply an erase gate to the Entry register on line 224.

When Head B Position Gate 4 and Bit 8 gate occur at Program Count 2 and Not X2, And circuit 225 supplies a signal to set trigger X2, FIG. 17, thereby insuring that the Sum register and Entry register are erased only for one complete cycle.

In FIG. 21, trigger X2, Program Count 2 and Bit 8 clock condition And circuit 226 to step the program count to 3. And circuit 227, FIG. 21, supplies an output to set the program count to 4 upon recognition of the Level clock in the selected level. Also, And circuit 228 supplies a Set Program Count 4 output upon recognition of a bit of data in the Sum register in connection with a Bit 1 gate input.

At Program Count 4 time the contents of shift register SR1 are transferred to the Sum register by conditioning And circuit 230, FIG. 23. Either Position Total 1 or Position Total 2 through Or block 222 gates the data in shift register SR2 through And circuit 231 to write the data in the Entry register. Shift registers SR1 and SR2 are gated at Program Count 4 time through And circuit 232, FIG. 23.

Program Count 4 with Bit 8 gate time conditions And circuit 223, FIG. 21, to step the program count to 5.

Referring to FIG. 20, whenever head B performs the function required as directed by function magnets 170–173, the function circuit breaker 235 supplies a signal through the level setting network 236 and, And circuit 237 to provide an operational signal on line 238. The operational signal on line 238 is applied to condition And circuit 239, FIG. 21, and with the program count at 5, sets the program count again to 1.

Another possibility that may occur at Program Count 5 time is conditioned when trigger X1 is On by And circuit 240, FIG. 23. An output from And circuit 240 will activate decode block 91, FIG. 3d, to turn the Multiplication control On. The output from And circuit 240 also resets the program count to 0 and resets triggers X1 and X2 off. During the foregoing procedures the contents of the format and program registers are analyzed to control the operations and more particularly to determine the presence of a decimal code in the format register. If a decimal code is not present in the numeric format line, the contents of Position register 1 and Position register 2 on drum 16 occurring during the fifth segment of the selected level, such as level 2, FIG. 2b, are transferred to the Sum register unconditionally and the contents of the Position register 2 are transferred to the Entry register in a conditional fashion, depending upon the register selected by the operator.

Head B, therefore, is used to pick up the arithmetic functions required for processing the information in the Position register 1 and Position register 2 and also to determine the beginning and termination of the field involved, while at the same time recognizing the appearance of the decimal code for proper handling. Head B also accomplishes the transfer of the running amounts contained in Position registers 1 and 2 to the Sum and Entry registers.

The operation of this nature takes place wherever there are amounts involved that have to be maintained as a running total such as in the Amount column on invoice 13.

To summarize, FIGS. 21, 22, and 23 are primarily concerned with the transfer of numeric format as preparation of document 13 progresses. Then, under certain circumstances, the contents of the position registers in the selected level are transferred to the arithmetic registers for accumulation of amounts entered and restoration to their original locations on drum 16. This would occur, as an example, if a running total of the Discounts encountered during the preparation of all invoices for a particular day, or a running total of the Shipping Charges for all invoices during a day were to be maintained in one of the position registers. The accumulations in Position register 1 would ordinarily apply to a specific individual accounting document, such as invoice 13, FIG. 2b. The running totals or final totals for each day would normally be accommodated in Position register 2 and would ordinarily comprise the totals for all accounting documents for an entire day's operations.

DETAILED PROCEDURES FOR PRINTING INFORMATION IN ARITHMETIC REGISTERS AND TRANSFERRING THE INFORMATION TO THE POSITION REGISTERS

The circuits involved in printing information stored in the arithmetic registers, that is, the Sum register, the Entry register, and the Crossfooting register on drum 16, and for transferring the same to the horizontal position registers 1 and 2 on drum 16 are shown in FIGS. 11, 24, 25, 26, and 27. Also, FIGS. 28 and 29 are of general interest with respect to gating of shift registers SR1 and SR2 as well as the gating of the head H associated with the Sum register.

FIG. 24 illustrates waveforms developed during the writing of information in the Sum register. The accessing of information in the arithmetic registers is from high order to low order sequence. As higher order digits are printed out, lower order digits are passed over. Access of the proper characters in sequence is under control of character marks contained in the individual character locations. The character marks enable the accessing of the digits without providing counting apparatus to keep track of which characters have been previously accessed in the arithmetic registers. When any character is read out of one of the arithmetic registers, the character mark in that character location is erased and moved to a different bit position, thereby preventing the subsequent read out of the same character.

Figure 25:
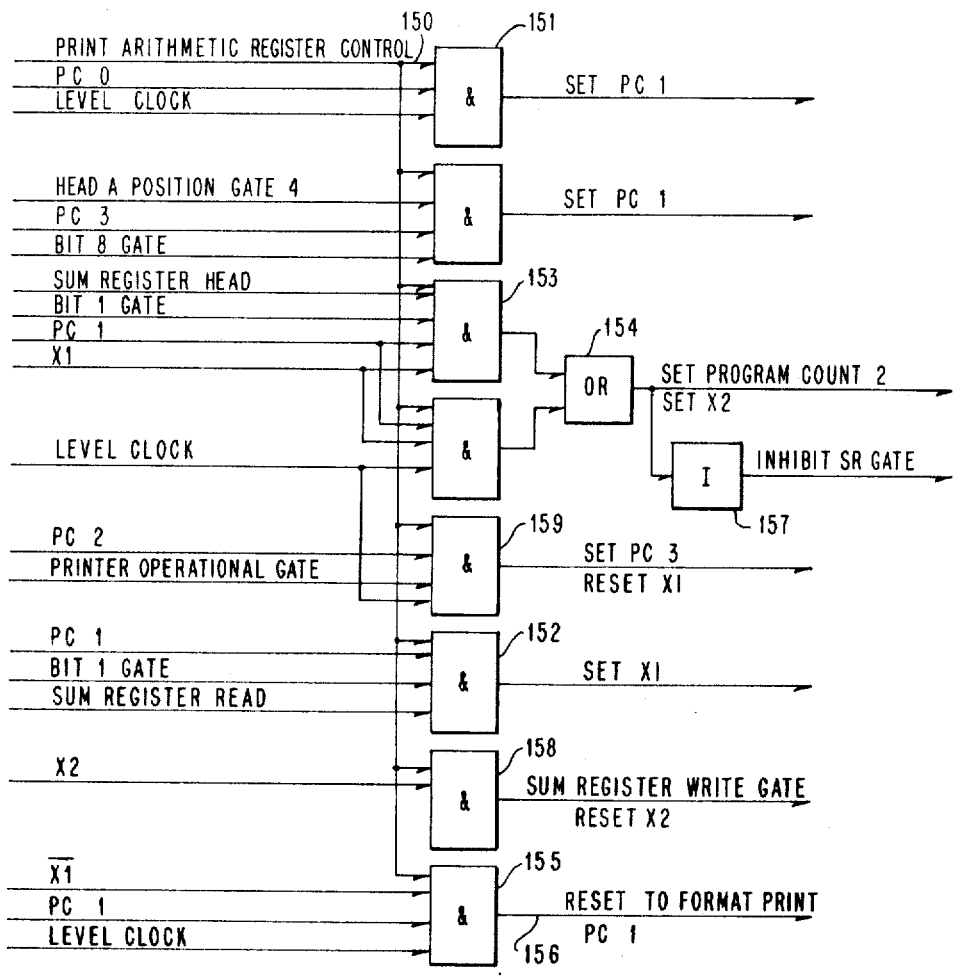

During the course of operations, when it is necessary to transfer information from the arithmetic registers, the Print Arithmetic register control line 150, FIGS. 25, 26, and 27, is activated. This conditions all of the gating logic in these figures.

Upon recognition of the Level clock for the selected level, And circuit 151 provides an output to set the program count to 1. During this operation, the Sum register contents are transferred to Shift Register SR1. The characters are streamed into shift register SR1 and the reading action is degated upon recogntion of the Level clock. This accomplishes the entry of the first character from the Sum register into shift register SR1.

Concurrently with the shifting of information from the Sum register to shift register SR1, the contents of the Entry register are transferred to shift register SR2. This occurs except during those program conditions which require the transfer of the contents of the Crossfooting register to shift register SR2. The crossfooting operation occurs, for example, during development of the invoice total on invoice 13, FIG. 2b, with the figure $1592.70 developed from the gross amount figure of $1600.00 taking into account the discount, the tax amount, and the shipping charge.

Referring to FIG. 25, Program Count 1 together with Bit 1 Gate and Sum Register Read conditions gate 152 to set the X1 trigger, FIG. 17. The conditions of X1, Program Count 1, Bit 1 Gate, and Not Sum Register Read conditions And circuit 153 and Or block 154 to supply an output for setting the program count to 2. Also, trigger X2 is set in FIG. 17. The And circuit 153 recognizes the occurrence of a character that has not been previously read by the Bit 1 Gate occurring as a character mark, as illustrated in FIG. 24.

Considering And circuit 155, FIG. 25, if trigger X1 had not been set as a result of recognizing a character in the Sum register, then Not X1, Program Count 1 and Level clock would supply an output on the line 156 to reset the circuits to "Format Print." This indicates that all of the information in the Sum register has been accessed.

The shift registers SR1 and SR2 are inhibited by action of the Inverter circuit 157, FIG. 25, when Or block 154 supplies an output at Bit 1 time. The characters of information are read bit by bit into the shift registers SR1 and SR2 concurrently.

When Or block 154 supplies an output, the program count is stepped to 2 and trigger X2 is set to its On state with the Bit 1 clock. Inverter 157 inhibits shifting and entry to the shift registers, thereby insuring that the character bits stored in the shift registers represent valid character configurations. The X2 trigger being On, conditions And circuit 158, FIG. 25, to gate the Sum register head H On for transferring a character mark to the Bit 2 location, FIG. 24. After 1 bit time trigger X2 is also reset through this circuit.

Program Count 2, together with an Operational signal from the typewriter and the recognition of the beginning of the level selected, conditions And circuit 159, FIG. 25 to set the program count to 3 and to reset trigger X1.

Referring to FIG. 26, And circuit 160 is conditioned by Program Count 3, Head A Position Gate 1 and a Total or Subtotal involving Position register 1 through Or block 161, to gate shift register SR1 to the printer magnet. If the inputs to Or block 161 are not active, the inverter 162 conditions And circuit 163 to gate shift register SR2 to the printer magnets.

In FIG. 27, And circuit 165 is conditioned by the control line 150, Head A Position Gate 3 and Program Count 3 so that head A is gated On to write zeros. And circuit 164 is gated to write ones when position totals are not gated, by the output of shift register SR1.

Position Total 1, Head A Position Gate 4, Program Count 3, and control line 150, condition And circuit 166 to supply an output for writing with head A and for controlling shift register SR2. Data is supplied from shift register SR2 to Head A through And circuit 167. Therefore, information flowing to head A comes from shift register SR1 unless there is a Position total 1 instruction or a Position total 2 instruction. If either of these conditions is true, then gate 164, FIG. 27, is deconditioned. If a Position total 1 instruction is involved, then the information to be written by head A is derived from shift register SR2. If a Position register 2 amount is involved, Position register 2 is erased at Program Count 3 through And circuit 168, FIG. 27.

ADDITIONAL CONTROLS

A number of additional control circuits are illustrated in FIGS. 28 and 29 for controlling the Sum register head H and the shift registers SR1 and SR2.

In FIG. 28, any of the Sum register Write gates, such as that derived from And circuit 158, FIG. 25, enters the Or circuit 170 to activate the Sum head to erase the Sum register. Any time data impulses are provided through Or block 171, the current is reversed in the Sum head Write circuit 172 thereby recording the information in the Sum register.

The shift register controls for shift registers SR1 and SR2 are shown in FIG. 29. Each of the shift registers SR1 and SR2 has parallel outputs on lines 175 and 176, respectively. Each also has a serial output indicated at 177 and 178. Control gates 179 and 180 gate the several positions of the shift registers. Data lines 181 and 182 provide data input. In addition, shift register SR1 has a Parallel Entry control 183 that receives information on lines 184 from the numeric keyboard 4 and the typewriter contacts operated by keys on keyboard 3, FIG. 1.

SYNOPSIS

As evidenced by the various entry and output procedures discussed, the unique arrangements of the apparatus disclosed herein provides considerable versatility and flexibility in the preparation of accounting documents. The inherent positional relationship of the print element and the primary head associated with the storage drum simplifies program entry and editing procedures as well as recognition of stored information for controlling the apparatus during document preparation. The equipment is highly automatic in nature and yet provides a high degree of operator control of stored format and program information. The correlation of programming information with the printed document requires a minimum of attention on the part of the operator. The circuits provided enable the printing of variable information that may be required for each accounting document as well as the printing of repetitive information in an automatic manner.

The accessing of format, program, and position total information is performed rapidly and efficiently with the auxiliary head and its associated control circuits and mechanisms.

While the invention has been particularly shown and described with reference to a preferred embodiment, it will be understood by those skilled in the art that various changes in form and detail may be made without departing from the spirit and scope of the invention.

What is claimed is:

1. Accounting apparatus, comprising:
    a printer, said printer having printing means and document supporting means;
    means for relatively moving said printing means and said document supporting means to successive positions on a supported document;
    storage means associated with said printer, said storage means having an individual storage location respectively associated with each position on a supported document;
    means for accessing said individual storage locations;
    means under control of said moving means for moving said accessing means to access the individual storage locations in said storage means as the respectively associated positions on said document are reached;
    auxiliary means for accessing said individual storage locations; and
    means for operating said auxiliary accessing means to access said storage locations independently of said moving means.

2. The apparatus of claim 1 which further comprises:
    key controlled means for generating digital signals; and
    means for selectively recording and reproducing said digital signals in said individual storage locations as they are accessed by said accessing means.

3. Accounting apparatus, comprising:
    a printer, said printer having printing means and document supporting means;
    means for relatively moving said printing means and said document supporting means to successive positions on a supported document;
    means in said printer for actuating said printing means to print characters and to perform printer operations;
    arithmetic means;
    program control means;
    means for generating control signals representative of printer characters, printer operations, arithmetic operations, and program control effects;
    drum storage means associated with said printer, said storage means having an individual track location respectively associated with each position on a supported document and a plurality of radially positioned registers;
    a transducer positioned adjacent said drum storage means for accessing said individual track locations;

means under control of said moving means for stepping said transducer to access each individual storage track as the respectively associated position on said document is reached;

and radial selection means responsive to said generated signals for selectively recording said signals in said radially positioned registers.

4. The apparatus of claim 3, which further comprises; editing means for controlling said apparatus to print characters and perform operations in response to signals stored in said radially positioned registers while maintaining a direct correlation between the individual storage tracks and the respectively associated positions on a supported document.

5. The apparatus of claim 3 which further comprises:
a printer keyboard having character and operational keys;
a plurality of control keys;
a numerical keyboard having numeric keys;
and means in said digital generating means for developing control signals in response to actuation of said printer keys and said control keys and for developing data signals in response to actuation of said numeric keys.

6. The apparatus of claim 3 which further comprises:
means for selectively accessing said radially positioned registers to reproduce signals stored therein;
and means responsive to said reproduced signals for controlling said printer, said arithmetic means, and said program control means.

7. The apparatus of claim 6 wherein:
said radial selection is manually controlled by operator oriented control keys during recording and reproduction of signals.

8. The apparatus of claim 6 wherein:
said radially positioned registers are assigned to a first category which is accessible for recording or reading of format and program digital signals under manual operator control and a second category which is accessible automatically and internally under program control; and which further comprises a plurality of arithmetic registers; and
means operable under program control for transferring digital signals from both first and second category registers in an interposed selective manner to said arithmetic registers.

9. The apparatus of claim 8 which further comprises:
means operable under program control for selectively transferring digital signals in said arithmetic registers to said second category registers and for concurrently actuating said printing means during said transfer operation.

10. Accounting apparatus, comprising:
a printer, said printer having printing means and adjacently positioned document supporting means;
printer escapement means for relatively stepping said printing means and said document supporting means to successive locations on a supported document;
a magnetic storage drum, said drum having an individual storage track associated with each location on a supported document, each of said tracks being divided into a predetermined number of sectors, each sector having a predetermined number of segments, and each segment having a predetermined number of character locations and said drum further having sector, segment, and character clocking tracks;
a storage transducer positioned adjacent said drum for accessing said individual tracks;
means under control of said printer escapement means for stepping said storage transducer in a synchronous manner to access each individual storage track on said drum as the respectively associated position on a supported document is reached;
an auxiliary transducer positioned adjacent said drum for accessing said individual tracks;
auxiliary escapement means for moving said auxiliary transducer independently of said storage transducer;
means under operator control and responsive to pulses derived from said drum clocking tracks for selecting a specific sector segment location on said drum;
first circuit means for controlling said storage transducer to write and read format or program information in a selected sector segment on said drum within any track location dependent upon the relative position of said printing means and said document;
and second circuit means for operating said auxiliary transducer escapement to position said auxiliary transducer for accessing format and program information in a selected sector segment within successive track locations on said drum and irrespective of the relative position of said printing means and said document.

11. The apparatus of claim 10 wherein said storage transducer and said auxiliary transducer are relatively displaced radially of said drum, and which further comprises:
means under control of said pulses derived from said drum for developing delayed pulse sets for controlling said storage transducer and said auxiliary transducer to access the same specific sector segment selected by an operator.

12. Accounting apparatus, comprising:
a typewriting printer, said printer having printing means and adjacently positioned document supporting means;
printer escapement means for relatively stepping said printing means and said document supporting means to successive horizontal locations on a supported document;
a magnetic storage drum, said drum having an individual storage track associated with each horizontal location on a supported document, each of said tracks being divided into a predetermined number of sectors, each sector having a predetermined number of segments, and each segment having a predetermined number of character locations and said drum further having sector, segment, and character clocking tracks;
a storage transducer positioned adjacent said drum for accessing said individual tracks;
means under control of said printer escapement means for stepping said storage transducer in a synchronous manner to access each individual storage track on said drum as the respectively associated horizontal position on a supported document is reached;
an auxiliary transducer positioned adjacent said drum for accessing said individual tracks;
auxiliary escapement means for moving said auxiliary transducer independently of said storage transducer;
means under operator control and responsive to pulses derived from said drum clocking tracks for selecting a specific sector segment location on said drum;
first circuit means for controlling said storage transducer to write and read format or program information in a selected sector segment on said drum within any track location dependent upon the relative horizontal position of said printing means and said document; and
second circuit means for operating said auxiliary transducer escapement to position said auxiliary transducer for accessing format and program information in a selected sector segment within successive track locations on said drum and irrespective of the relative horizontal position of said printing means and said document.

13. Accounting apparatus, comprising:
a printer;
cyclically operable means in said printer for printing characters on a document and performing printer operations;

a magnetic storage drum, said drum having an individual storage track respectively associated with positions on a document, said drum further being divided radially into a plurality of sectors, each sector comprising a predetermined number of segments;

a plurality of individual clock tracks on said drum, said clock tracks comprising a set of sector clock tracks corresponding in number to the number of sectors on said drum, a set of segment tracks corresponding in number to the total number of segments in all sectors on said drum;

a storage transducer positioned adjacent said drum for accessing individual storage tracks;

a sector transducer movable to any of said sector clock tracks for developing sector timing pulses;

a segment transducer movable to any of said segment clock tracks for developing segment timing pulses;

means under control of said printer for stepping said storage transducer in a synchronous manner to access individual storage track on said drum as respectively associated positions on a supported document are reached;

operator controlled means for selectively positioning said sector transducer adjacent one of said sector clock tracks to thereby select a particular sector on said drum;

operator controlled means for selectively positioning said segment transducer adjacent one of said segment clock tracks to thereby select a particular segment within the selected sector; and means for recording and reproducing digital signals in a selected sector and segment.

14. Accounting apparatus, comprising:

a typewriting printer, said printer having a single element print head and document supporting means;

escapement means for stepping said print head along a supported document to successive horizontal positions;

means in said printer for actuating said print head to print a character on said document or to perform a printer operation at each said horizontal position;

a magnetic storage drum, said drum having an individual storage track associated with each horizontal position on a supported document, said drum further being divided radially into a predetermined number of sectors (levels) of equal length, each sector comprising a predetermined number of segments (modes) of equal length, and each segment comprising a predetermined number of character storage locations;

a plurality of individual clock tracks on said drum, said clock tracks comprising a set of sector clock tracks corresponding in number to the number of sectors on said drum, a set of segment tracks corresponding in number to the total number of segments in all sectors on said drum, and a bit clock track;

a storage transducer positioned adjacent said drum for accessing individual storage tracks;

a sector transducer movable to any of said sector clock tracks for developing sector timing pulses;

a segment transducer movable to any of said segment clock tracks for developing segment timing pulses;

means under control of said escapement means for stepping said storage transducer in a synchronous manner to access each individual storage track on said drum as the respectively associated horizontal position on a supported document is reached;

operator controlled means for positioning said sector transducer adjacent one of said sector clock tracks to thereby select a particular sector on said drum;

operator controlled means for positioning said segment transducer adjacent all of said segment clock tracks to thereby select a particular segment within the selected sector; and operator controlled means for selecting a particular character location within the selected sector and segment on said drum for reading or writing of information.

References Cited
UNITED STATES PATENTS

| Re. 24,584 | 1/1959 | Hooven | 95—4.5 |
| 2,853,696 | 9/1958 | Mendelson | 340—173 |

PAUL J. HENON, *Primary Examiner.*

R. ZACHE, *Assistant Examiner.*